United States Patent
O

(10) Patent No.: US 8,845,432 B2
(45) Date of Patent: Sep. 30, 2014

(54) METHOD, APPARATUS AND RECORDING MEDIUM FOR GAME USING TOUCH INPUT

(75) Inventor: Min Hwan O, Seoul (KR)

(73) Assignee: Neowiz Games Co., Ltd., Seongnam-Si, Gyeonggi-Do (KR)

( * ) Notice: Subject to any disclaimer, the term of this patent is extended or adjusted under 35 U.S.C. 154(b) by 866 days.

(21) Appl. No.: 13/054,842

(22) PCT Filed: Nov. 25, 2010

(86) PCT No.: PCT/KR2010/008375
§ 371 (c)(1),
(2), (4) Date: Jan. 19, 2011

(87) PCT Pub. No.: WO2012/036348
PCT Pub. Date: Mar. 22, 2012

(65) Prior Publication Data
US 2012/0071241 A1 Mar. 22, 2012

(30) Foreign Application Priority Data
Sep. 16, 2010 (KR) ................ 10-2010-0091264

(51) Int. Cl.
*A63F 13/06* (2006.01)
(52) U.S. Cl.
USPC .................. 463/37; 463/31; 463/42
(58) Field of Classification Search
USPC .............................. 463/31, 42, 37
See application file for complete search history.

(56) References Cited

U.S. PATENT DOCUMENTS

2008/0171595 A1* 7/2008 Nakasaka ............. 463/31

FOREIGN PATENT DOCUMENTS

| JP | 2001-145777 A | 5/2001 |
| JP | 3962059 | 5/2007 |
| JP | 2008-200295 A | 9/2008 |
| JP | 2010-36038 A | 2/2010 |
| JP | 2012-525953 A | 10/2012 |
| KR | 10-2005-0117808 | 12/2005 |
| KR | 10-0867401 | 11/2008 |
| WO | 2007/032135 | 3/2007 |

OTHER PUBLICATIONS

Japanese Office Action for 2012-534129 dated May 27, 2013, citing the above reference(s).
International Search Report and Written Opinion of the International Searching Authority for PCT/KR2010/008375, citing the above reference(s).

* cited by examiner

*Primary Examiner* — Omkar Deodhar
(74) *Attorney, Agent, or Firm* — Lowe, Hauptman & Ham, LLP

(57) ABSTRACT

Disclosed is game technology, and more particularly to a method, an apparatus, and a recording medium for a game using touch input, which can more variously control the display, etc. of elements of a game screen, thereby providing games capable of employing various game schemes.

17 Claims, 25 Drawing Sheets

HEAD OF NOTE

TAIL OF NOTE

NOTE: $N_1(NHP_1)$, $N_2(NHP_2)$, $N_3(NHP_3)$

JUDGMENT AREA INDICATION: $JAI(JCP_1, JCP_2, JCP_3, JCP_4)$

HEAD OF NOTE

TAIL OF NOTE (a)

JUDGMENT AREA INDICATION
JAI(JCP₁, JCP₂, JCP₃, JCP₄)

(b)

JUDGMENT AREA INDICATION
JAI₁(JCP₁), JAI₂(JCP₂), JAI₃(JCP₃), JAI₄(JCP₄)

NOTE : $N_1 (NHP_1), N_2 (NHP_2), N_3 (NHP_3)$

JUDGMENT AREA INDICATION : $JAI(JCP_1, JCP_2, JCP_3, JCP_4)$

HEAD OF NOTE

TAIL OF NOTE

JUDGMENT AREA INDICATION : JAI(JCP$_1$, JCP$_2$, JCP$_3$, JCP$_4$)
JUDGMENT AREA INDICATION : IAI$_1$(IRP$_1$), IAI$_2$(IRP$_2$), IAI$_3$(IRP$_3$), IAI$_4$(IRP$_4$)

(b)

(a)

US 8,845,432 B2

METHOD, APPARATUS AND RECORDING MEDIUM FOR GAME USING TOUCH INPUT

CROSS-REFERENCE TO RELATED APPLICATION

This application claims the priority of Korean Patent Application No. 10-2010-0091264, filed on Sep. 16, 2010 in the KIPO (Korean Intellectual Property Office), the disclosure of which is incorporated herein in their entirety by reference. Further, this application is the National Phase application of International Application No. PCT/KR2010/008375, filed Nov. 25, 2010, which designates the United States and will be published in English. Each of these applications is hereby incorporated by reference in their entirety into the present application.

TECHNICAL FIELD

The present invention relates to game technology. More particularly, the present invention relates to a method, an apparatus, and a recording medium for a game using touch input, which can more variously control the display, etc. of elements of a game screen, thereby providing games capable of employing various game schemes.

BACKGROUND ART

The conventional game employs a scheme in which an indication for guiding an operation timing of a user is displayed and moves on a game screen, the indication is operated at a specific timing guided by the indication, and the operation is judged, thereby providing a game result. However, the movement pattern of the indication or the judgment method for the operation of the user is too monotonous, so that the user may disadvantageously lose interest in the game.

DISCLOSURE

Technical Problem

Accordingly, the present invention has been made to solve the above-mentioned problems occurring in the prior art, and an object of the present invention is to provide a game which can control more variously the display, etc. of elements of a game screen, thereby providing games capable of employing various game schemes.

Further, another object of the present invention is to provide a game capable of variously judging for the operation of the user.

Technical Solution

In accordance with an aspect of the present invention, there is provided a game apparatus comprising: a game screen controller configured to control a division of a game screen displayed on a touch screen into multiple track areas, a showing of a judgment area indication on the game screen, and a showing of a note while moving toward the judgment area indication, wherein the note includes a head and a tail, wherein the tail is connected to the head in a predetermined length, and wherein the tail includes at least one track area change point; a touch input recognition unit configured to recognize a touch input through the touch screen; and a judgment unit configured to judge at least one of an accuracy, success, or failure of the touch input, based on a recognition result of the touch input and states of the note and the judgment area indication.

In accordance with another aspect of the present invention, there is provided a game method of a game apparatus, the method comprising: controlling a division of a game screen displayed on a touch screen into multiple track areas, a showing of a judgment area indication on the game screen, and a showing of a note while moving toward the judgment area indication, wherein the note includes a head and a tail, wherein the tail is connected to the head in a predetermined length, and wherein the tail includes at least one track area change point; recognizing a touch input through the touch screen; and judging at least one of an accuracy, success, or failure of the touch input, based on a recognition result of the touch input and states of the note and the judgment area indication.

In accordance with another aspect of the present invention, there is a computer-readable medium containing a set of instructions adapted to perform a game method, the medium comprising: at least one instruction adapted to control a division of a game screen displayed on a touch screen into multiple track areas, a showing of a judgment area indication on the game screen, and a showing of a note while moving toward the judgment area indication, wherein the note includes a head and a tail, wherein the tail is connected to the head in a predetermined length, and wherein the tail includes at least one track area change point; at least one instruction adapted to recognize a touch input through the touch screen; and at least one instruction adapted to judge at least one of an accuracy, success, or failure of the touch input, based on a recognition result of the touch input and states of the note and the judgment area indication.

In accordance with another aspect of the present invention, there is a game apparatus comprising: a display configured to display a game screen, the game screen being divided into multiple track areas and showing a note, the note including an input start indication part and an input maintenance indication part; a note type controller configured to determine a note type of the note shown on the game screen and to control a showing of at least one of the input start indication part or the input maintenance indication part according to the determined note type; and a judgment controller configured to judge at least one of an accuracy, success, or failure of an operation based on an inputted operation signal and a position of the note.

In accordance with another aspect of the present invention, there is a game apparatus comprising: a display configured to display a game screen, the game screen being divided into multiple track areas and showing a first note and at least one second note, the first note including a first input start indication part and a first input maintenance indication part shown over at least two track areas, and the second note including a second input start indication part and a second input maintenance indication part having a length of zero or more; and a note display controller configured to control a showing of at least one selected from the first note and the at least one second note on the game screen, thereby preventing at least one of the first input start indication part or the first input maintenance indication part of the first note and at least one of the second input start indication part or the second input maintenance part of the at least one second note from simultaneously reaching an judgment criterion position in a same track area.

In accordance with another aspect of the present invention, there is a game apparatus comprising: a touch screen configured to display a game screen, the game screen being divided into multiple track areas and showing a note, and to recognize a touch input, wherein the note includes an input start indication part and an input maintenance indication part and wherein the input maintenance indication part is shown over at least two track areas among the multiple track areas; and a maintenance judgment controller configured to judge if the recognized touch input is maintained from a first time when the input start indication part reaches a judgment criterion position in the track area among the multiple track areas up to a second time when the input maintenance indication part reaches the judgment criterion position of at least one track area among the multiple track areas, the recognition of the touch input being started at the first time, thereby judging at least one of an accuracy, success, or failure of the touch input of the note, and further judge if a position of the recognized touch input changes according to a showing of a track area change point while maintaining a state of the recognized touch input, from the first time when the input start indication part reaches the judgment criterion position in the track area among the multiple track areas up to a third time when the track area change point of the input maintenance indication part shown over the at least two track areas reaches the judgment criterion position of the at least two track areas, thereby judging at least one of an accuracy, success, or failure of the touch input of the note.

In accordance with another aspect of the present invention, there is a game apparatus comprising: a touch screen configured to display a game screen and to recognize a touch input, the game screen being divided into multiple track areas and showing a note, and the note including an input start indication part and an input maintenance indication part; and a partial judgment controller configured to judge an input maintenance time during which the recognized touch input is maintained from a first time when the input start indication part reaches a judgment criterion position of the track area among the multiple track areas up to a second time when the input maintenance indication part reaches the judgment criterion position of at least one track area among the multiple track areas, the recognition of the touch input being started at the first time, calculate the number of judgments for each length of the note based on the judged input maintenance time, and judge at least one of an accuracy, success, or failure of the touch input as many as the calculated number of judgments, thereby partially judging the touch input in the input maintenance indication part.

In accordance with another aspect of the present invention, there is a game apparatus comprising: a touch screen configured to display a game screen showing a note, and to recognize a touch input; a memory configured to store a preset criterion touch input time at which the touch input has to be performed when a position of the note corresponds to a judgment criterion position designated in advance with respect to each of the notes used in a game; and a controller configured to judge at least one of an accuracy, success, or failure of the touch input of the note, based on a difference value between a touch input time of the touch input recognized through the touch screen and the preset criterion touch input time of the note.

Advantageous Effects

Accordingly, the present invention has an effect of providing the game, which can more variously control the display, etc. of elements of a game screen, thereby providing games capable of employing various game schemes.

Further, the present invention has another effect of providing the game capable of variously judging the operation of the user.

BRIEF DESCRIPTION OF THE DRAWINGS

The above and other aspects, features and advantages of the present invention will be more apparent from the following detailed description taken in conjunction with the accompanying drawings, in which.

BEST MODE

Mode for Invention

Figure 1:
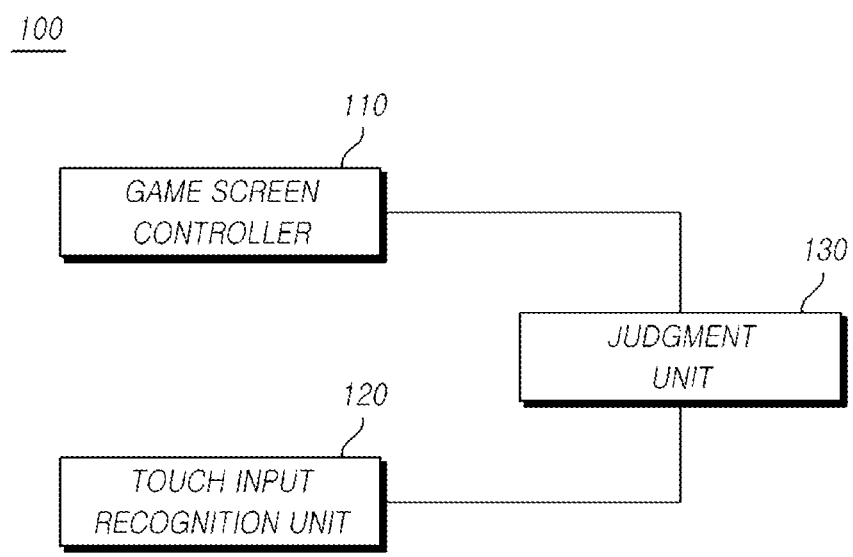
FIG. 1 is a block diagram illustrating a game apparatus according to an embodiment of the present invention.

Hereinafter, exemplary embodiments of the present invention will be described with reference to the accompanying drawings. The construction illustrated in the exemplary embodiments and drawings is merely a preferred embodiment of the present invention, and does not speak for the technical sprit of the present invention. In the following description, the same elements will be designated by the same reference numerals although they are shown in different drawings. Further, in the following description, a detailed explanation of known related functions and constitutions may be omitted so as to avoid unnecessarily obscuring the subject manner of the present invention.

Further, in describing the constructional elements of the present invention, the terms of a first, a second, A, B, (a), (b), or the like, can be used. Such a term is only for discriminating the constructional element from another constructional element, and does not limit the essential feature, order, or sequence of the constructional element, or the like. If one constructional element is "coupled to", "assembled with", or "connected to" another constructional element, one constructional element is directly coupled to or connected to another constructional element, but it can be understood as another different constructional element can be "coupled", "assembled", or "connected" between each constructional element.

FIG. 1 is a block diagram illustrating a game apparatus 100 according to an embodiment of the present invention.

A game provided by the game apparatus 100 illustrated in FIG. 1 according to the embodiment of the present invention employs a scheme in which a user touches and inputs a specific point of a touch screen in accordance with an input timing (operation timing) and/or an input position indicated by a constructional element displayed on a game screen on a touch screen and identifies a judgment result according to the touch and input.

Further, such a game may employ a scheme in which a part of constructional elements displayed on a game screen is displayed according to the flow of reproduced music during the reproduction of the music, so that the user can play the game similarly with the performance or the playing of the music. The game can be referred to as a music game, a rhythm game, a performance game, or a play game.

As illustrated in FIG. 1, the game apparatus 100 according to the embodiment of the present invention includes a game screen controller 110 for controlling the game screen and display of the constructional elements of the game screen, a touch input reorganization unit 120 for recognizing a touch input of a user, and a judgment unit 130 for judging an accuracy or success or failure of a touch input.

A game screen controller 110 controls a division of a game screen displayed on a touch screen into multiple track areas, a showing of a Judgment Area Indication (JAI) on the game screen, and a showing of a note (N) while moving toward the JAI, wherein the note includes a head and a tail, wherein the tail is connected to the head in a predetermined length, and wherein the tail includes at least one track area change point. Here, the tail included in the note N is connected with the head by a predetermined length, so that the tail can be displayed over at least two track areas among the multiple track areas.

The touch input recognition unit 120 recognizes a touch input through the touch screen, and as a recognition result, it can identify, for example, a touch input time and a touch input position. Further, the touch input recognition unit 120 recognizes a touch maintained from the user's touch (press) of the touch screen to the release of the touch as a single touch input.

As used herein, it is described that the touch input is performed and recognized through the touch screen, which is, however, only an example. The touch input can be received by using a separate touch input means, such as a touch pad, other than the touch screen, and recognized according to the circumstances.

The judgment unit 130 judges at least one of an accuracy, success, or failure of the touch input, based on a recognition result of the touch input and states of the note N and the JAI.

As described above, the note N includes the head and the tail, wherein the head indicates a start point of a touch input and the tail indicates a length, by which the touch input has to be maintained, and a position change of the maintained touch input.

The user starts a touch input in accordance with a time at which the head of the note N reaches the JAI, and has to maintain the started touch input until the tail of the note N reaches the JAI subsequent to the head.

The judgment unit 130 judges if the recognition of the touch input has started at the time at which the head of the note N reaches the JAI, judges if the recognized touch input maintains until the tail of the note N reaches the JAI, and judges an accuracy or success or failure of the touch input of the note N.

Further, while a track area change point of the tail of the note N displayed over at least two track areas reaches the JAI, the judgment unit 130 further judges if a position of the recognized touch input changes according to the indication of the track area change point in the state of the maintenance of the recognized touch input and judges an accuracy or success or failure of the touch input of the note N.

Further, the judgment unit 130 identifies an input maintenance time of the touch input, which has maintained from the time of the reach of the head with the JAI up to the time of the reach of the tail with the JAI, calculates the number of judgments for each length of the note N based on the identified input maintenance time, and judges an accuracy or success or failure of the touch input in number equal to the calculated number of judgments for each length of the note N. That is, the judgment unit 130 performs a partial judgment for the touch input of the note.

The aforementioned note has a note type (a third note type) including the head and the tail connected with the head by a predetermined length and displayed over at least two track areas among the multiple track areas. The game screen according to the present invention can display the notes in various note types, other than the note in the third note type, and the various note types will be described later in more detail.

In the foregoing description, the game apparatus 100 according to the embodiment of the present invention has been schematically described. Hereinafter, the game screen controller 110, the touch input recognition unit 120, and the judgment unit 130 included in the game apparatus 100 will be described in more detail.

Various constructional elements, such as multiple track areas, the note N, and the JAI, are displayed on the game screen of the game apparatus 100 according to the embodiment of the present invention.

The game apparatus 100 according to the embodiment of the present invention displays a distance change between the note N and the JAI according to the movement of the note N and a position of the note N and the JAI on the game screen, so that it is possible to inform the user of a timing and a position for the touch input.

Further, the game apparatus 100 according to the embodiment of the present invention can provide more joyful and various games by variously controlling the display of the constructional elements of the game screen. The game screen controller 110 for controlling the game screen will be described in more detail.

The game screen controller 110 can divide the game screen into multiple track areas. Herein, the track area refers to an area on the game screen including a track on which the note N moves. According to the number of track areas, the degree of difficulty, or the like, of the game may be differentiated. Further, the number of track areas may be set as a single value or several values in the game apparatus 100, be selectively set by the user, or be changed and set through automatic selection of a value among preset values according to the difficulty of several games.

The game screen controller 110 can control a kind (a type), a shape, a color, an expression pattern on the game screen, a movement pattern (speed, movement route, etc.) on the game screen, etc., of the note N that moves on the multiple track areas of the game screen. Further, the game screen controller 110 can control an expression pattern on the game screen or a movement pattern of the note N according to the flow of music.

The note N basically includes the head serving as an input start indication part for indicating the start of the touch input and the tail serving as an input maintenance indication part for indicating how long the touch input has to be maintained. The head and the tail can have various shapes, colors, sizes, etc., and are controlled by the game screen controller 110.

The game screen controller 110 can control the number of track areas over which the head and the tail constituting the note N are displayed.

That is, under the control of the game screen controller 110, the head can be displayed on the single track area or over at least two track areas among the multiple track areas. Further, the game screen controller 110 can control the presence, a length, a shape, or a thickness of the tail. When the length of the tail is not zero, the tail is displayed on the single track area, or the tail includes at least one bent point (the track area change point) so that the tail is displayed over at least two track areas among the multiple track areas according to the control of the game screen controller 110.

The game screen controller 110 can control the display of the head and the tail of the note N through determining one note type among various predefined note types. Hereinafter, a first note type, a second note type, a third note type, and a fourth note type among the various predefined note types will be described.

The first note type is a note type including a head displayed on a single track area. Such a first note type can be defined as a note type including a head displayed on a single track area and a tail having a length of zero. Then, every note can be defined as a note including a head and a tail.

The second note type is a note type including a head displayed on a single track area and a tail displayed on a single track area.

The third note type is a note type including a head displayed on a single track area and a tail displayed over at least two track areas. The third note type can be referred to as a modification of the second note type.

The fourth note type is a note type including a head displayed over at least two track areas and a tail displayed in a zigzag shape over at least two track areas. The fourth note type can be referred to as a modification of the second note type or the third note type.

Among the aforementioned four note types, the tail included in the third note type and the fourth note type is displayed over at least two track areas. As such, the tail included in the third note type and the fourth note type is displayed over at least two track areas, so that the tail has a point displayed over at least two track areas, i.e. a bent point (referred to as the "track area change point").

The bent point of the tail is a point at which a position of the touch input has to be changed while maintaining the touch input at a previous position of the head or the tail.

In this respect, the head of the note N indicates a start point of the touch input and the tail indicates the maintenance time duration (maintenance length) of the touch input and the position change of the touch input. The position change of the touch input can be performed through a drag operation on the touch screen.

Also, the note N in the first note type is referred to as a "short note", the note N in the second note type is referred to as a "long note", the note N in the third first note type is referred to as a "slide note", and the note N in the fourth note type is referred to as a "rub note".

Further, there may be a note type in which both the head and the tail are displayed on at least two identical track areas, in addition to the aforementioned four note types. The user operation for the note N in this note type is the touch input of at least two corresponding track areas and the maintaining of the touch input without changing the position of the touch input. In addition, it is possible to define various note types for use through changing the aforementioned note types.

Under the control of the game screen controller 110, a Judgment Criterion Position (JCP) that is a criterion for the judgment of the note N for each of the multiple track areas is designated on a display region of the JAI according to each of the multiple track areas.

The game screen control unit 110 can control the number of JAIs displayed on the game screen. Under the control of the game screen control unit 110, the single JAI can be displayed over the entirety of the multiple track areas or the JAI can be displayed on each of the multiple track areas.

Under the control of the game screen control unit 110, the JAI can be fixedly displayed or be displayed while moving.

In order to prevent at least one of the head and the tail of the note N (e.g. the slide note) and at least one of the head and the tail of at least one another note (e.g. the short note, the long note, the slide note, or the rub note) from reaching the identical JCP at the same time, the game screen control unit 110 can control the display of at least one of the note N and at least one another note on the game screen.

Only if at least one of the head and the tail of the note N (e.g. the slide note) and at least one of the head and the tail of at least one of the other notes (e.g. the short note, the long note, the slide note, and the rub note) does not reach the identical JCP at the same time, the multiple notes may simultaneously reach each of the different JCPs at the same time.

Further, if the positions, at which the track area change points (the point displayed over at least two track areas) of each of the multiple slide notes reaches the JAI, do not overlap with each other, that is, if the JCPs, which the track area change points of each of the slide notes reach, are different from each other, the track area change point of each of the slide notes also can reach the JAI at the same time under the control of the game screen controller 110.

Under the control of the game screen controller 110, an Input Area (IA) for the touch input is designated for each of the multiple track areas, and a single Input Representative Position (IRP) representing a corresponding IA is designated for each IA designated for each of the multiple track areas.

Under the control of the game screen controller 110, an Input Area Indication (IAI) is displayed on the IA designated for each of the multiple track areas.

Under the control of the game screen controller 110, the JCP and the IRP are designated in an identical position or in a different position for each of the multiple track areas. That is, the JCP and the IRP designated in each of the track areas may be located in an identical position or in a different position.

The user intuitively recognizes the timing and the position for the touch input while viewing the game screen controlled by the game screen control unit 110 and displayed on the touch screen and touches a corresponding point of the game screen in accordance with the recognized timing and position.

Then, the touch input recognition unit 120 recognizes the touch input of the user through the touch screen and the judgment unit 130 considers the touch input recognized by the touch input recognition unit 120 and a display state of the constructional elements displayed on the game screen at the time of the touch input, to judge if the timing, the position, the maintenance, the maintenance time duration, the position change (movement) of the corresponding touch input are correct.

A judgment method by the judgment unit 130 will be described in more detail.

The judgment unit 130 judges if the recognition of the touch input has been started at a time of reach of the head of the note N at the JAI and if the recognized touch input is maintained until the reach of the tail of the note N with the JAI, and then judges an accuracy or success or failure of the touch input of the note N.

Further, until the reach of the track area change point of the tail of the note N displayed over at least two track areas with the JAI, the judgment unit 130 further judges if the position of the recognized touch input is changed according to the display of the track area change point while maintaining a state of the recognized touch input and judges the accuracy or success or failure of the touch input of the note N.

The judgment methods by the judgment unit 130 in the case where the JCP is different from the IRP (i.e. the JCP≠ the IRP) and the case where the JCP is identical to the IRP (touch input position) (i.e. the JCP= the IRP) will be described again, respectively. Further, each case will be described in accordance with a judgment method according to a position (distance) and a judgment method according to a time.

First, when the JCP and the IRP are designated in different positions for each of the multiple track areas, the judgment unit 130 can judge the touch input by using any one method of the judgment method according to the position (distance) and the judgment method according to the time.

When the judgment unit 130 judges the touch input by using the judgment method according to the position (distance), the judgment unit 130 can identify a touch input time and the IRP of the touch input through the corresponding IA from the recognition result of the touch input and judge the accuracy or success or failure of the touch input of the note N based on a distance value between the JCP corresponding to the identified IRP and the position of the note N at the identified touch input time. With regard to this, the judgment unit 130 determines to which among multiple ranges (e.g. distance value≤RIGHT, RIGHT<distance value<RANGE, and distance value>FAIL) corresponding to each of multiple different judgment result information (e.g. PERFECT, GOOD, and BREAK), respectively, the distance value between the JCP and the position of the note N belongs and obtains judgment result information corresponding to the determined range, it is possible to judge the accuracy or success or failure of the touch input of the note N.

When the judgment unit 130 judges the touch input by using the judgment method according to the time, the judgment unit 130 can identify a touch input time of the touch input through the corresponding IA from the recognition result of the touch input and judge the accuracy or success or failure of the touch input of the note N based on a difference value between the identified touch input time and a criterion touch input time preset for the note N. With regard to this, the judgment unit 130 determines to which among multiple ranges (e.g. difference value≤RIGHT, RIGHT<difference value<RANGE difference value>FAIL) corresponding to each of multiple different judgment result information (e.g. PERFECT, GOOD, and BREAK) the difference value between the JCP and the position of the note N belongs and obtains judgment result information corresponding to the determined range, it is possible to judge the accuracy or success or failure of the touch input of the note N.

Next, when the JCP and the IRP are designated in the identical position for each of the multiple track areas, the judgment unit 130 can judge the touch input by using any one method of the judgment method according to the position (distance) and the judgment method according to the time.

When the judgment unit 130 judges the touch input by using the judgment method according to the position (distance), the judgment unit 130 can identify a touch input time and the IRP of the touch input through the corresponding IA from the recognition result of the touch input and judge the accuracy or success or failure of the touch input of the note N based on a distance value between the identified IRP and the position of the note N at the identified touch input time. With regard to this, the judgment unit 130 determines to which among multiple ranges (e.g. distance value≤RIGHT, RIGHT<distance value<RANGE, and distance value>FAIL) corresponding to each of multiple different judgment result information (e.g. PERFECT, GOOD, and BREAK) the distance value between the JCP and the position of the note N belongs and obtains judgment result information corresponding to the determined range, it is possible to judge the accuracy or success or failure of the touch input of the note N.

When the judgment unit 130 judges the touch input by using the judgment method according to the time, the judgment unit 130 can identify a touch input time of the touch input through the corresponding IA from the recognition result of the touch input and judge the accuracy or success or failure of the touch input of the note N based on a difference value between the identified touch input time and a preset criterion touch input time for the note N. With regard to this, by determining to which among multiple ranges (e.g. difference value≤RIGHT, RIGHT<difference value<RANGE, difference value>FAIL) corresponding to each of multiple different judgment result information (e.g. PERFECT, GOOD, and BREAK) the difference value between the JCP and the position of the note N belongs and obtains judgment result information corresponding to the determined range, it is possible to judge the accuracy or success or failure of the touch input of the note N.

The position of the note N mentioned in the description of the judgment methods may be one of a Note Head Position (NHP) of the head and a Note Tail Position (NTP) of the tail.

Further, the criterion touch input time mentioned in the description of the judgment methods includes a touch input time preset for a case where the NHP is identical to the JCP designated in the track area corresponding to the NHP and a touch input time preset for a case where the NTP(s) is identical to the JCP(s) designated in the track area corresponding to the NTP(s).

The game apparatus 100 according to the embodiment of the present invention may include a portable terminal, such as a smart phone, a mobile communication terminal, a game device, such as a portable game device and an arcade game device, and the like, but it is not limited thereto and can be implemented in any electronic device if the electronic device has the touch screen.

Hereinafter, a display method and a display control of the constructional elements of the game screen, and a method of the touch input and the judgment will be described with reference to exemplary drawings.

Figure 2:
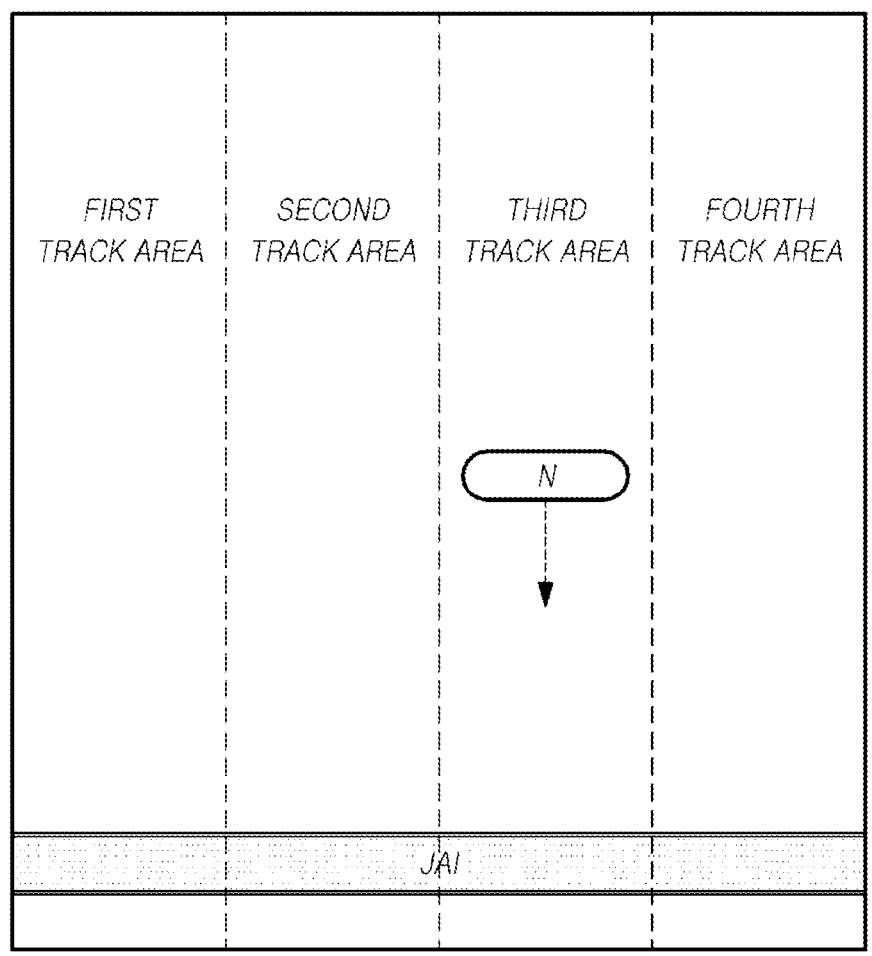
FIG. 2 is a diagram illustrating a fundamental construction of a game screen.

FIG. 2 is a diagram illustrating a fundamental construction of the game screen.

FIG. 2 exemplarily illustrates the fundamental construction of the game screen. As illustrated in FIG. 2, the game screen is divided into multiple track areas (a first track area, a second track area, a third track area, and a fourth track area). Further, the game screen displays the note N moving along at least one track area among the multiple track areas and the JAI toward which the note N moves. The note N illustrated in FIG. 2 is the short note in the first note type.

Figure 3:
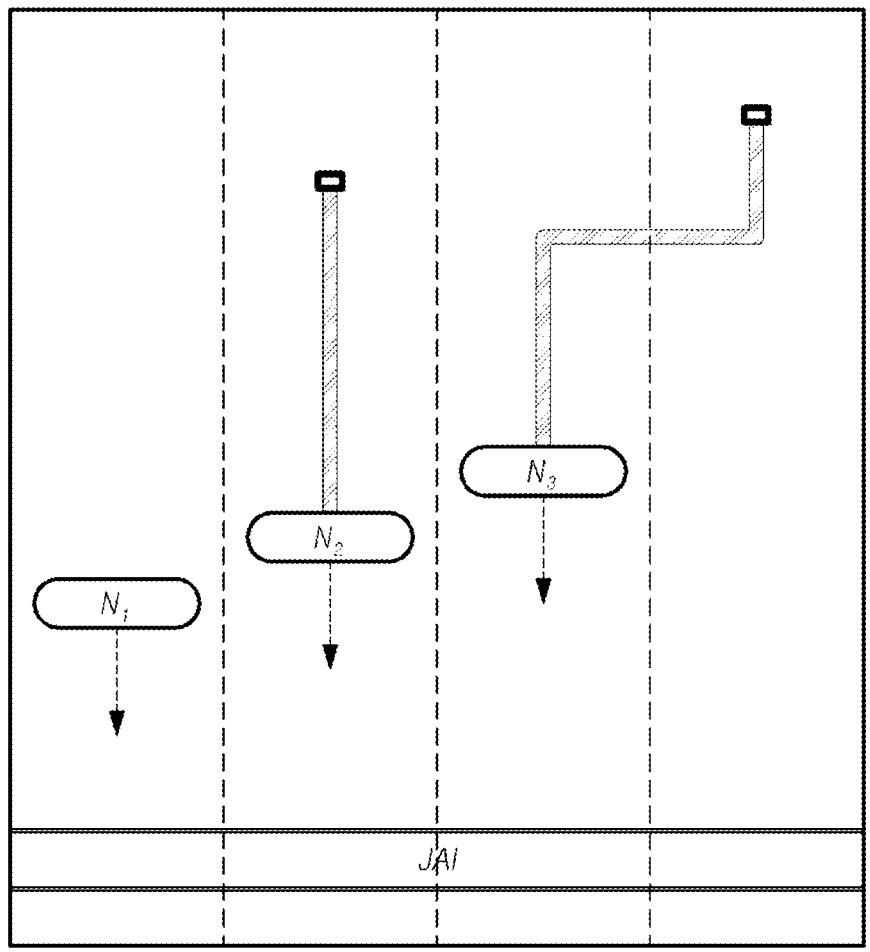
FIGS. 3 and 4 are diagrams illustrating a kind of notes.
Figure 3:
Figure 3:
Figure 4:
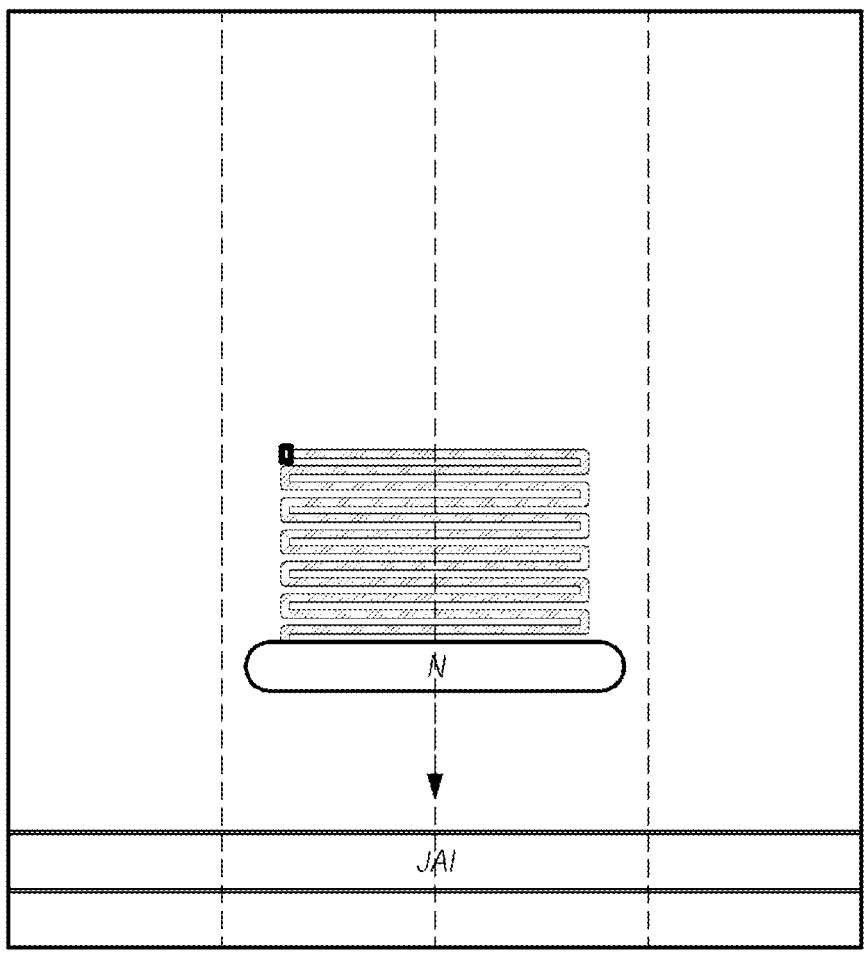

FIGS. 3 and 4 are diagrams illustrating the kinds of notes.

FIG. 3 exemplarily illustrates three kinds of notes. A note $N_1$ is the short note in the first note type including the head and the tail having the length of zero, a note $N_2$ is the long note in the second note type including the head and the tail displayed on the single track area, and a note $N_3$ is the slide note in the third note type including the head and the tail displayed over at least two track areas.

The note N exemplarily illustrated in FIG. 4 is a zigzag note in the third note type including the head displayed over at least two track areas and the tail displayed in a zigzag shape over at least two track areas.

Figure 5:
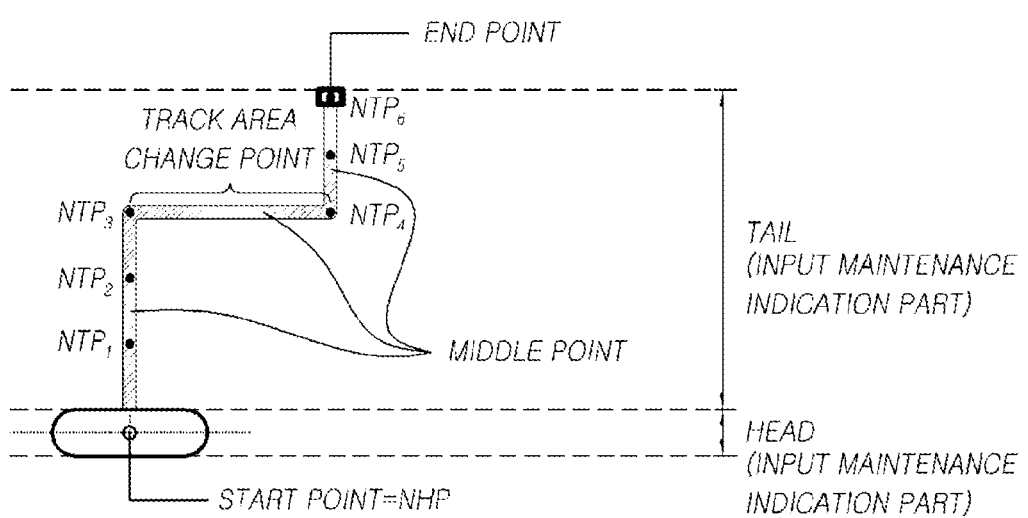
FIG. 5 is a diagram illustrating a shape of a note.

FIG. 5 is a diagram illustrating a shape of the note N.

The note N in the third note type including the head and the tail displayed over at least two track areas is exemplified for the description of the shape of the note N with reference to FIG. 5. The shape of the note N in the third note type can be applied to the touch input in another note type through the modification.

Referring to FIG. 5, the note N includes the head and the tail according to the shape viewpoint. Further, the note N can include the start point, the middle point, and the end point according to the start; end viewpoint.

The head of the note N includes a point indicative of the NHP, which serves as the start point.

The tail of the note N includes the middle point represented in a continuous line and the end point at which the continuous line ends. Further, the tail of the note N includes a bent point of the continuous line, which serves as the track area change point. Further, the tail of the note N includes multiple points indicative of the NTP. In FIG. 5, six points of the tail serve as the NTPs ($NTP_1$, $NTP_2$, $NTP_3$, $NTP_4$, $NTP_5$, and $NTP_6$), respectively, so that it is possible to indicate the position on the game screen.

The note N moves toward the JAI on the game screen, so that the NHP and the NTP are changed according to the movement of the note N.

The shape of the note N functions as the guidance of the timing (time point) or the position of the touch input of the user. The head of the note N is a part (input start indication pan) for indicating the start of the touch input, and the tail of the note N is a part (input maintenance indication part) for indicating the maintenance time duration and the position change of the touch input.

Figure 6:
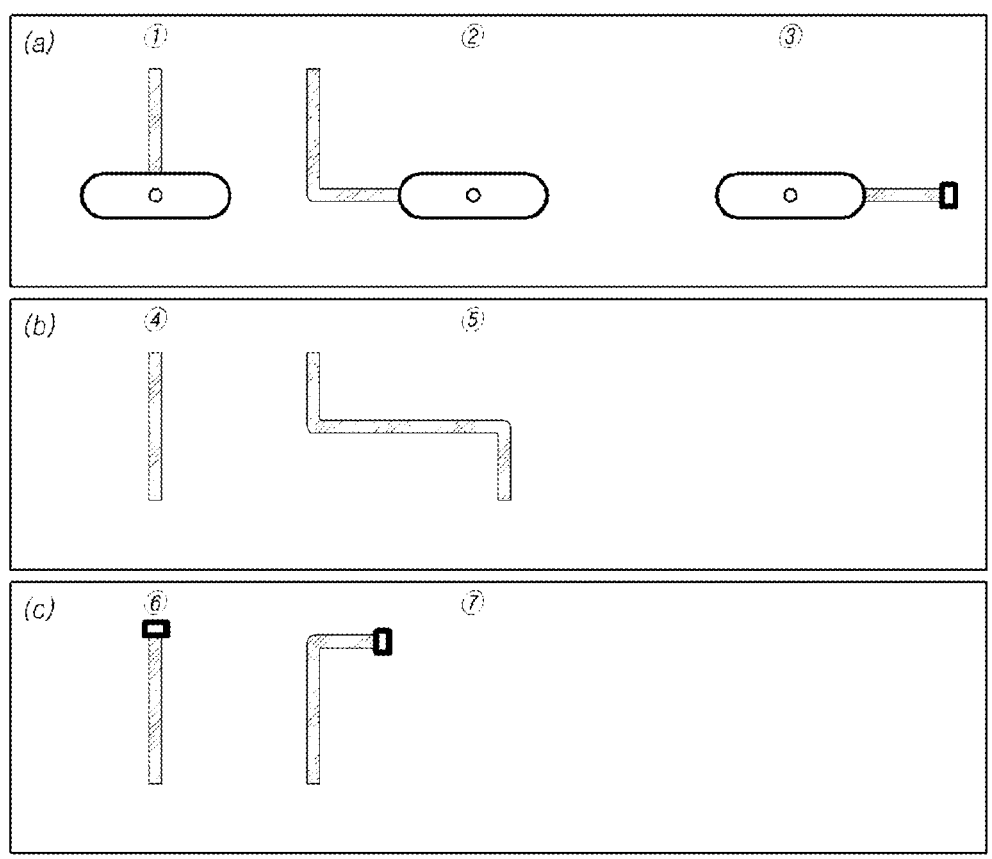
FIGS. 6A to 6C are diagrams exemplarily illustrating a start shape, a middle shape, and an end shape of a note.

FIGS. 6A to 6C are diagrams exemplarily illustrating the start shape, the middle shape, and the end shape of the note N.

In FIGS. 6A to 6C, it is assumed that the movement direction of the head or the tail (i.e. the direction toward the JAI) is the downward direction of the drawing sheet.

FIG. 6A exemplarily illustrates the start shape of the note N. In the start shape ①, an upper part of the head is connected with the tail. In the start shape ②, a side of the head is connected with the tail and the tail is upwardly bent again. In the start shape ③, a side of the head is connected with the tail, to end without bending.

According to the start shapes of the note N, the method of the touch input of the user varies and judgment factors in the game apparatus 100 vary.

In the start shape ①, the touch input includes an input start and an input maintenance, and the judgment factors determined in the judgment include a touch input start timing/position, whether the touch input is maintained, etc.

In the start shape ②, the touch input includes a slide input and an input maintenance, and the judgment factors determined in the judgment includes a timing/position of the start of the touch input, whether the track area is changed or not, a timing/position (movement range) of the change of the track area, whether the touch input is maintained in the change track area, etc. The judgment factors are sequentially determined, so that the judgment result can be outputted according to success or failure of the judgment factors. For example, when all of the judgment factors succeed, the judgment result is "PERFECT", and when one of the judgment factors fails, the judgment result is "BREAK".

In the start shape ③, the touch input includes a slide input and an input end, and the judgment factors determined in the judgment includes a timing/position of the start of the touch input, whether the track area is changed or not, a timing/position (movement range) of the change of the track area, etc. The judgment factors are sequentially determined, so that the judgment result can be outputted according to success or failure of the judgment factors. For example, when all of the judgment factors succeed, the judgment result is "PERFECT", and when one of the judgment factors fails, the judgment result is "BREAK".

FIG. 6B exemplarily illustrates the middle shape of the note N. In the middle shape ④, the tail is in a shape of a straight line. In the middle shape ⑤, the tail includes a bent point.

In the middle shapes of the note N, the method of the touch input of the user varies and judgment factors in the game apparatus 100 vary.

In the middle shape ④, the touch input includes an input maintenance, and the judgment factors determined in the judgment includes whether the touch input is maintained, a maintenance time duration (maintenance length) of the touch input, etc.

In the middle shape ⑤, the touch input includes an input maintenance, a slide input, and an input maintenance, and the judgment factors determined in the judgment includes whether the touch input is maintained, whether the track area is changed or not, a timing/position (movement range) of the change of the track area, whether the touch input is maintained in the change track area, etc. The judgment factors are sequentially determined, so that the judgment result can be outputted according to success or failure of the judgment factors. For example, when all of the judgment factors succeed, the judgment result is "PERFECT", and when one of the judgment factors fails, the judgment result is "BREAK".

FIG. 6C exemplarily illustrates the end shape of the note N. In the middle shape ⑥, the tail ends without a bent point. In the end shape ⑦, the tail includes a bent portion immediately before the end.

According to the end shapes of the note N, the method of the touch input of the user is different and judgment factors in the game apparatus 100 become different.

In the middle shape ⑥, the touch input includes an input maintenance and an input end, and the judgment factors determined in the judgment includes whether the touch input is maintained, a maintenance time duration (maintenance length) of the touch input, etc.

In the end shape ⑦, the touch input includes an input maintenance, a slide input, and an input end, and the judgment factors determined in the judgment includes whether the touch input is maintained, whether the track area is changed or not, a timing/position (movement range) of the change of the track area, etc. The judgment factors are sequentially determined, so that the judgment result can be outputted according to success or failure of the judgment factors. For example, when all of the judgment factors succeed, the judgment result is "PERFECT", and when one of the judgment factors fails, the judgment result is "BREAK".

Figure 7:
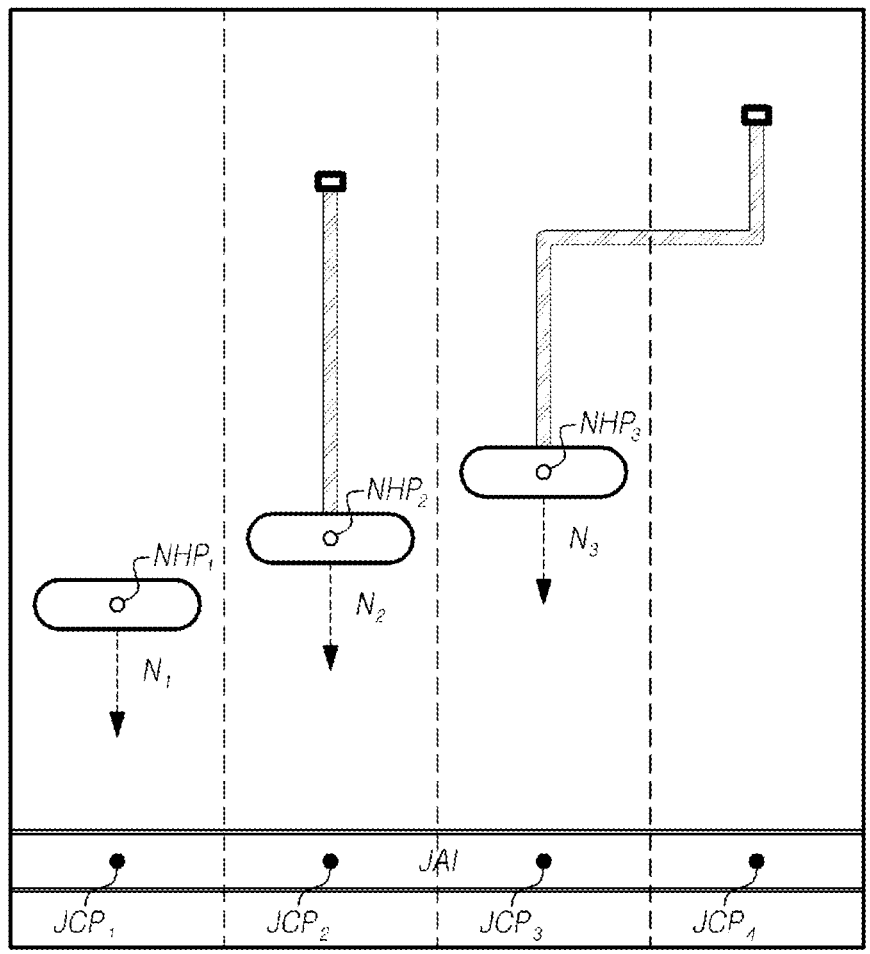
FIG. 7 is a diagram illustrating a JCP designated for each of multiple track areas on a display region of a JAI.
Figure 7:
Figure 7:

FIG. 7 is a diagram illustrating the JCP designated for each of the multiple track areas on a display region of the JAI.

Referring to FIG. 7, four JCPs ($JCP_1$, $JCP_2$, $JCP_3$, and $JCP_4$) designated for each of four track areas are displayed on the display region of the JAI. The JCP is information serving as a criterion for the judgment in the corresponding track area, and is information compared with the position of the note N (including the NHP, and possibly further including the NTP).

Referring to FIG. 7, each note moves toward the JCP designated in the corresponding track area. To this end, the game screen controller 110 controls the movement of the note N so as to make the NHP and the NTP of each note close to a value of the JCP designated in the corresponding track area. For example, under the control of the game screen controller 110, the $NHP_1$ of the note $N_1$ can move toward the $JCP_1$ of the first track area, the $NHP_2$ and the $NTP_2$s of the note $N_2$ can move toward the $JCP_2$ of the second track area, and the $NHP_3$ of the note $N_3$ can move toward the $JCP_3$ of the corresponding track area and the $NTP_3$s of the note $N_3$ can move toward the $JCP_2$ of the second track area and the $JCP_3$ of the third track area.

Figure 8:
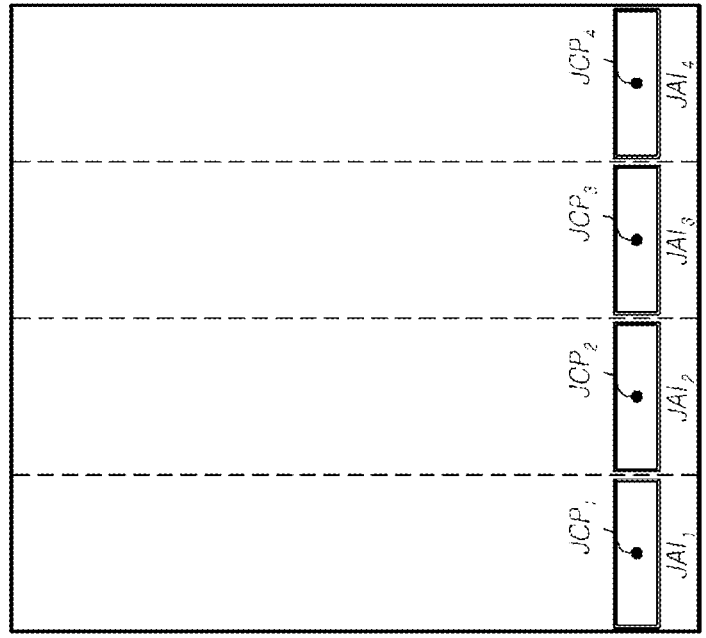
FIGS. 8A and 8B are diagrams exemplarily illustrating a display method of a JAI according to the division of the JAI for each of the track areas.
Figure 8:
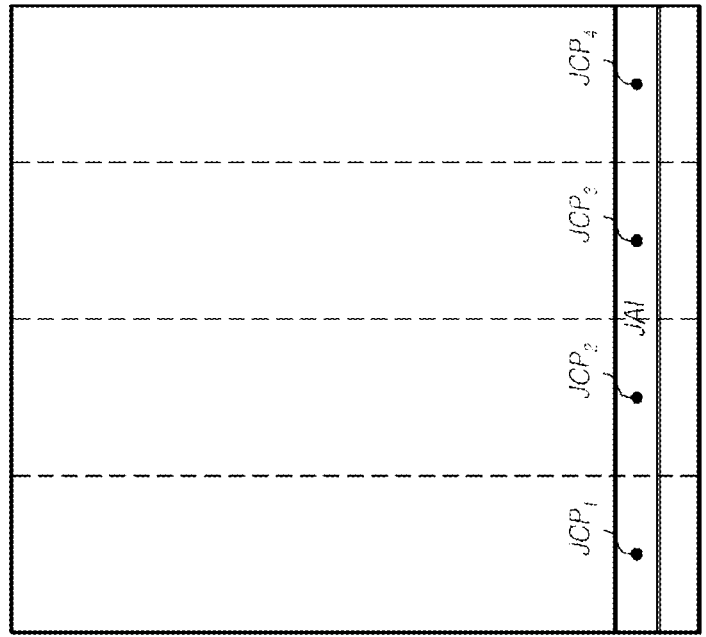

FIGS. 8A and 8B are diagrams exemplarily illustrating the display method of the JAI according to the division of the JAI for each of the track areas.

As illustrated in FIG. 8A, the JAI can be displayed in a single form over the entirety of four track areas.

Further, as illustrated in FIG. 8B, the JAI can be divided into four JAIs ($JAI_1$, $JAI_2$, $JAI_3$, and $JAI_4$) for each of four track areas and displayed on the four track areas, respectively.

Figure 9:
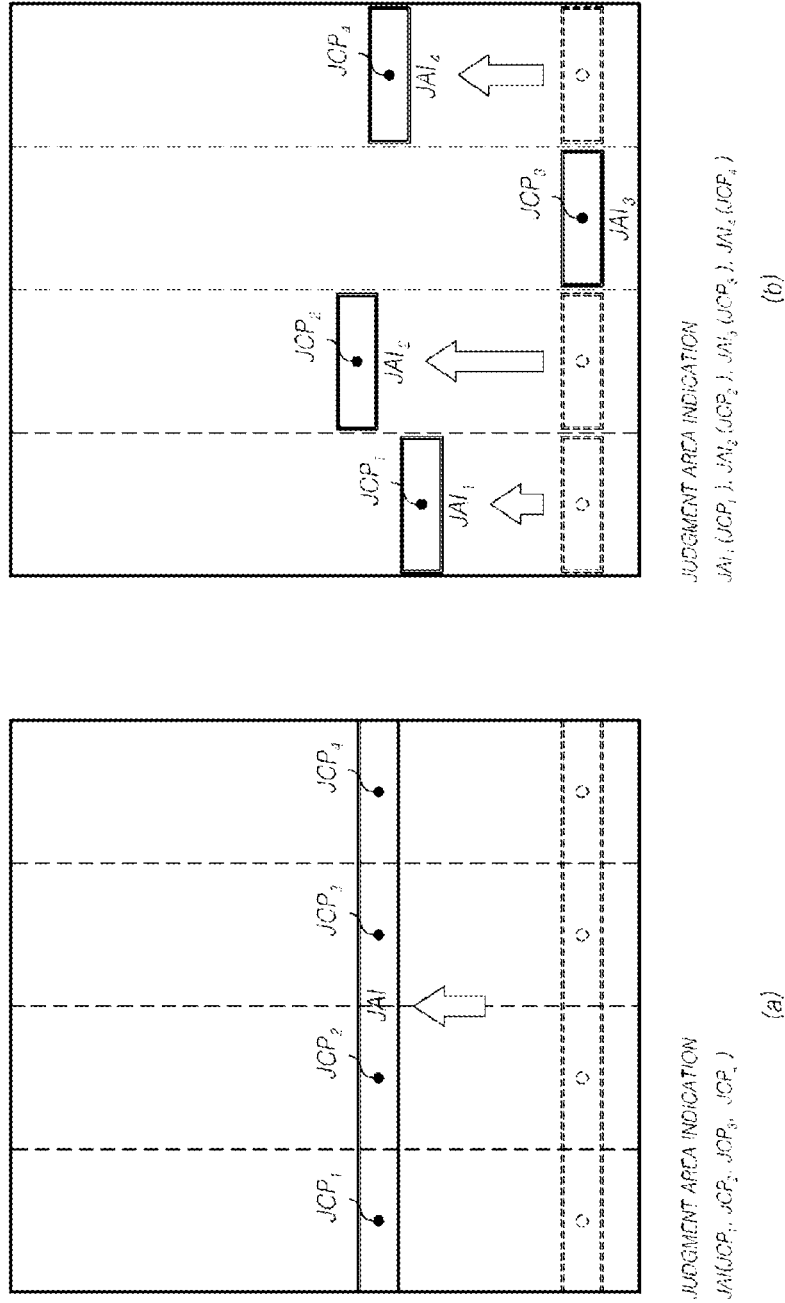
FIGS. 9A and 9B are diagrams exemplarily illustrating a display method of a JAI when the JAI can move.

FIGS. 9A and 9B are diagrams exemplarily illustrating the display method of the JAI when the JAI can move.

The JAI can be fixedly displayed at a specific position of the game screen or the displayed position of the JAI can be changed during the process of a single game. FIGS. 9A and 9B illustrate the case in which the JAI moves.

FIG. 9A is a diagram illustrating the movement of the single JAI when the JAI is displayed in the single form over the four track areas like FIG. 8A. The movement of the JAI may be incurred according to a game option, etc.

FIG. 9B is a diagram illustrating the movement of three JAIs ($JAI_1$, $JAI_2$, and $JAI_4$) among the four JAIs ($JAI_1$, $JAI_2$, $JAI_3$, and $JAI_4$) when the JAI is divided into four JAIs ($JAI_1$, $JAI_2$, $JAI_3$, and $JAI_4$) for each of four track areas and displayed on the four track areas, respectively, like FIG. 8B. The movement and the movement distance of each of the four JAIs may be incurred according to a game option, etc.

Figure 10:
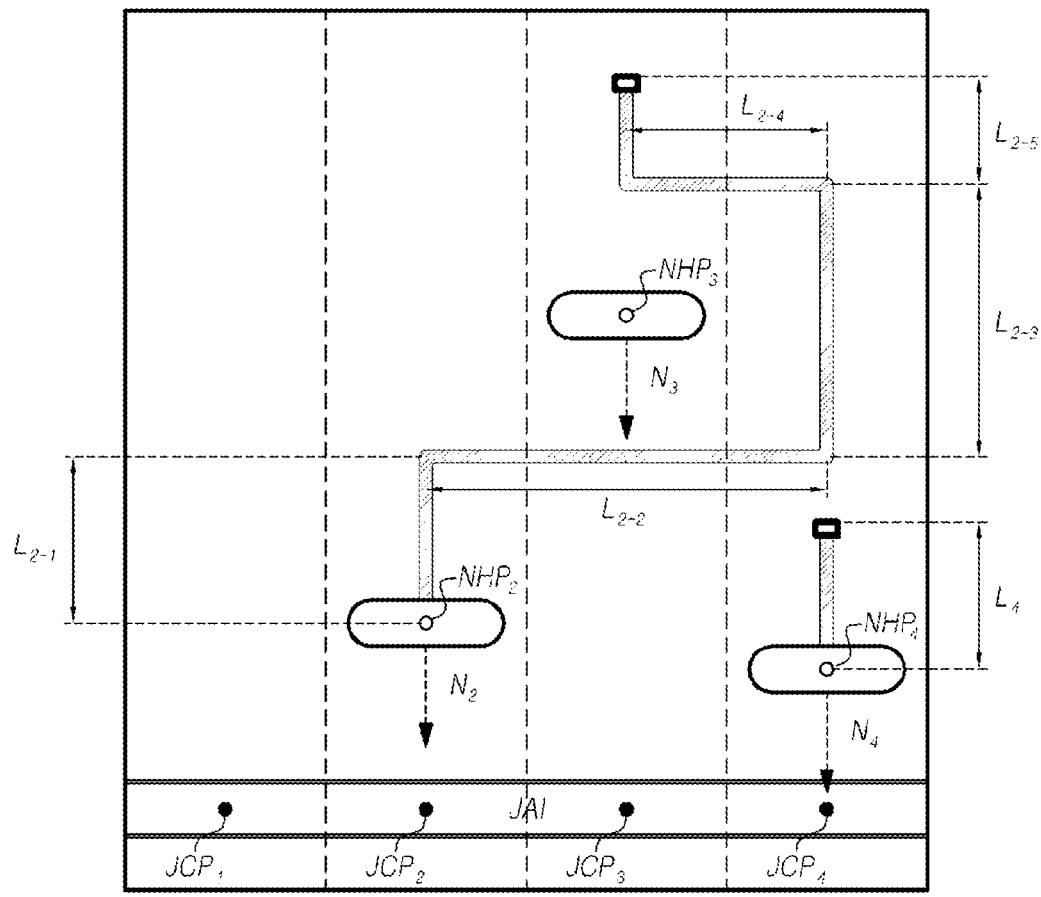
FIG. 10 is a diagram illustrating a method for controlling a display of a note considering a time of reach of the JAI of each note.
Figure 10:
Figure 10:

FIG. 10 is a diagram illustrating a method for controlling the display of the note N considering a time of reach of the JAI of each note.

The game screen of FIG. 10 displays three notes. The note $N_2$ is the slide note in the third note type and has a movement pattern in which the $NHP_2$ moves on the second track area and the $NTP_2$ moves on the second track area, the third track area, and the fourth track area, and the length L of the note $N_2$ is a sum of $L_{2\cdot1}$, $L_{2\cdot2}$, $L_{2\cdot3}$, $L_{2\cdot4}$, and $L_{2\cdot5}$ (i.e. $L=L_{2\cdot1}+L_{2\cdot2}+L_{2\cdot3}+L_{2\cdot4}+L_{2\cdot5}$). The note $N_3$ is the short note in the second note type and has a movement pattern in which the $NHP_3$ moves on the third track area. The note $N_4$ is the long note in the second note type and has a movement pattern in which the $NHP_4$ moves on the fourth track area and the $NTP_4$ moves on the fourth track area, and the length L of the note $N_3$ is $L_4$.

Prior to the description of the note N display control with reference to FIG. 10, the description related to the time of the reach of the note N to the JCP will be given.

The multiple notes (the heads and the tails) can reach the different JCPs of the JAI at the same time. With regard to this, the touch screen has to support the multi touches.

However, when the multiple notes (the heads and the tails) reach the identical JCP of the JAI at the same time, an error may be incurred in the process of the touch input maintenance, so that in order to prevent the error, the game screen controller 110 can control the movement pattern, the display position, or the movement speed of the note N. That is, when the multiple notes reach the identical JCP of the JAI at the same time, the game screen controller 110 can control the display method of the note N so as to differentiate the time of the reach of each of the multiple notes with the JCP.

The three notes ($N_2$, $N_3$, and $N_3$) illustrated in FIG. 10 are displayed through the control according to the above method. If it is assumed that the movement speeds of the three notes ($N_2$, $N_3$, and $N_3$) are identical, it can be noted that there is no head or tail of another note that simultaneously reaches the $JCP_4$, at the time of the reach of the head of the note $N_3$ with the $JCP_4$. Further, it can be noted that there is no head or tail of another note that simultaneously reaches the $JCP_4$, at the time of the reach of the tail of the note $N_3$ with the $JCP_4$.

Further, it can be noted that there is no head or tail of another note that simultaneously reaches the $JCP_2$, at the time of the reach of the head of the note $N_2$ with the $JCP_2$. It can be noted that there is no head or tail of another note that simultaneously reaches the $JCP_2$, until the reach of the tail of the note $N_2$ with the $JCP_2$ to the reach of the tail corresponding to the $L_{2\cdot1}$ with the $JCP_2$. Further, it can be noted that there is no head or tail of another note that simultaneously reaches at least one of the $JCP_2$, the $JCP_3$, and the $JCP_4$ at the time of the reach of the tail (i.e. the part displayed over the second track area, the third track area, and the fourth track area) of the note N corresponding to the $L_{2\cdot2}$ with the $JCP_2$, the $JCP_3$, and the $JCP_4$. Further, it can be noted that there is no head or tail of another note that simultaneously reaches the $JCP_4$ until the reach of the tail of the note N corresponding to the $L_{2\cdot3}$ with the $JCP_4$. Further, it can be noted that there is no head or tail of another note that simultaneously reaches at least one between the $JCP_4$ and the $JCP_3$ at the time of the reach of the tail (i.e. the part displayed over the fourth track area and the third track area) of the note N corresponding to the $L_{2\cdot4}$ with the $JCP_4$ and the $JCP_3$.

Figure 11:
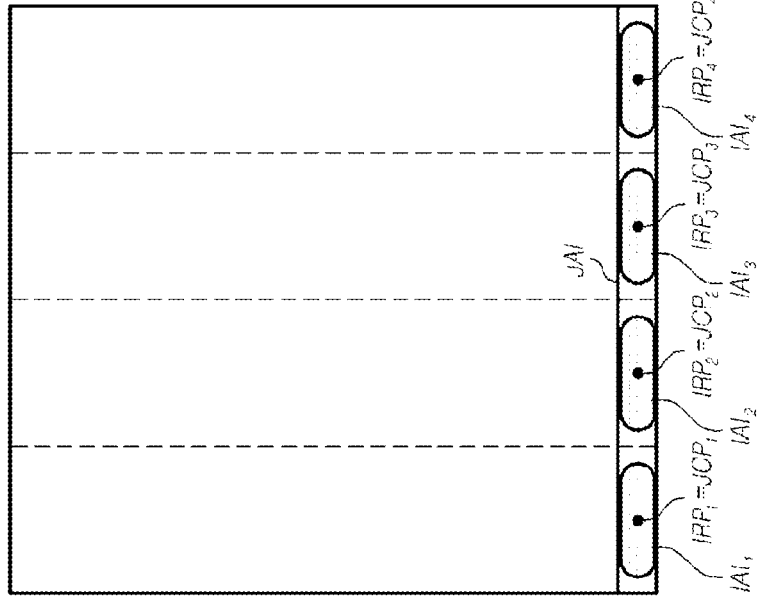
FIGS. 11A and 11B are diagrams exemplarily illustrating an IA and an IRP on a game screen, an IAI that is an additional element of the game screen, and a display method of the IAI.
Figure 11:
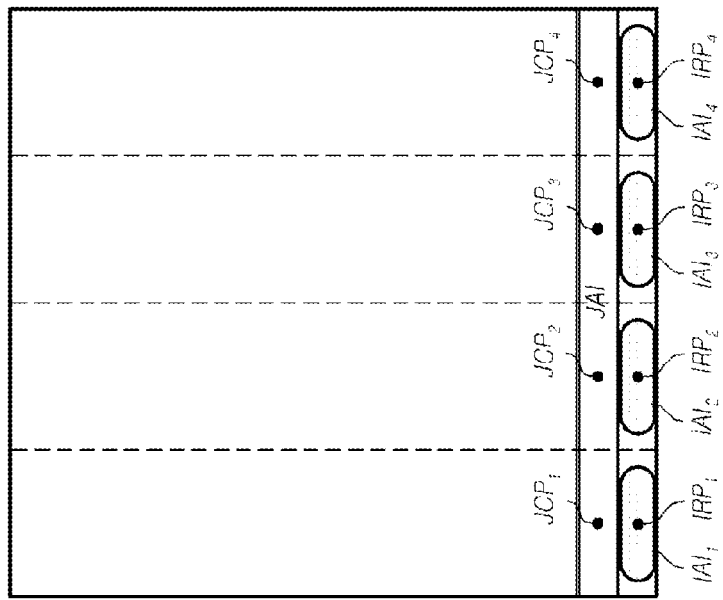

FIGS. 11A and 11B are diagrams exemplarily illustrating the IA and the IRP of the game screen, the IAI that is an additional element of the game screen, and a display method of the IAI.

As illustrated in FIGS. 11A and 11B, in each of the track areas, the JCP can be designated in the display region of the JAI that can be displayed over the entire track areas or on each of the track areas. Further, in each of the track areas, the IA is designated and the single IRP capable of representing every position of the corresponding designated IA can be designated. Further, the IAI for indicating the IA to the user can be displayed in each of the track areas.

As illustrated in FIGS. 11A and 11B, the JCP and the IRP designated for each track area can be designated in the identical position or in the different position.

FIG. 11A illustrates the case where the JCP and the IRP designated for each track area are in the different position. With regard this, an $IA_1$ and an $IRP_1$ are designated in the first track area and the designated $IA_1$ is displayed with the $IAI_1$. An $IA_2$ and an $IRP_2$ are designated in the second track area, and the designated $IA_2$ is displayed with the $IAI_2$. An $IA_3$ and an $IRP_3$ are designated in the third track area and the designated $IA_3$ is displayed with the $IAI_3$. An IA4 and an $IRP_4$ are designated in the fourth track area, and the designated IA4 is displayed with the $IAI_4$.

Referring to FIG. 11A, the $IAI_1$, $IAI_2$, $IAI_3$, and $IAI_4$ can be displayed without overlap with the JAI, and thus the JCP and the IRP designated for each track area can be in the different position. That is, $JCP_1 \neq IRP_1$, $JCP_2 \neq IRP_2$, $JCP_3 \neq IRP_3$, and $JCP_4 \neq IRP_4$. As described above, when the JCP and the IRP are designated in the different position, the game apparatus 100 corresponds the JCP with the IRP for management, so that the game apparatus 100 can process the judgment by considering the touch input performed at the IRP as if the touch input has performed with the JCP.

Therefore, when the JCP and the IRP are designated in the different position, there is an effect in that the user can conveniently touch input while well observing the moment at which the note N reaches the JAI.

FIG. 11B illustrates the case where the JCP and the IRP designated for each track area are in the identical position. With regard this, an $IA_1$ and an $IRP_1$ are designated in the first track area, and the designated $IA_1$ is displayed with the $IAI_1$. An $IA_2$ and an $IRP_2$ are designated in the second track area, and the designated $IA_2$ is displayed with the $IAI_2$. An $IA_3$ and an $IRP_3$ are designated in the third track area, and the designated $IA_3$ is displayed with the $IAI_3$. An $IA_4$ and an $IRP_4$ are designated in the fourth track area, and the designated IA4 is displayed with the $IAI_4$.

Referring to FIG. 11B, the $IAI_1$, $IAI_2$, $IAI_3$, and $IAI_4$ can be displayed in a form in which the $IAI_1$, $IAI_2$, $IAI_3$, and $IAI_4$ are included in the JAI, and thus the JCP and the IRP designated for each track area can be in the identical position. That is, $JCP_1=IRP_1$, $JCP_2=IRP_2$, $JCP_3=IRP_3$, and $JCP_4=IRP_4$. As described above, when the JCP and the IRP are designated in the identical position, there is an effect in that when the game apparatus 100 is a mobile device, it is possible to improve the utilization of the space of the game screen, etc.

FIGS. 12A and 12B are diagrams exemplarily illustrating the game screen for the description of a method for touch input by the user.

FIG. 12A illustrates the method for the touch input by the user until the reach of the corresponding note N with the JAI in the case where the JCP and the IRP designated for each track area are in the different position.

FIG. 12B illustrates the method for the touch input N by the user until the reach of the corresponding note N with the JAI in the case where the JCP and the IRP designated for each track area are in the identical position.

The note N commonly illustrated in FIGS. 12A and 12B includes the head having the NHP that is changed according to the movement of the note N and the tail having a single bent point (track area change point) and displayed over the third track area and the fourth track area. The length of the tail is the sum of lengths ($L_1$, $L_2$, and $L_3$) of three individual segments. The head moves toward the $JCP_3$ designated in the third track area. That is, the NHP is changed so as to become adjacent to the $JCP_3$ fixedly designated in the third track area. The tail moves toward the designated $JCP_3$ and $JCP_4$ in the third track area and the fourth track area while maintaining the illustrated shape. That is, the NTP is changed so as to become adjacent to the $JCP_3$ and $JCP_4$ fixed and designated in the third track area.

It is assumed that the note N commonly illustrated in FIGS. 12A and 12B moves in a predetermined movement speed V toward the JAI.

Figure 12:
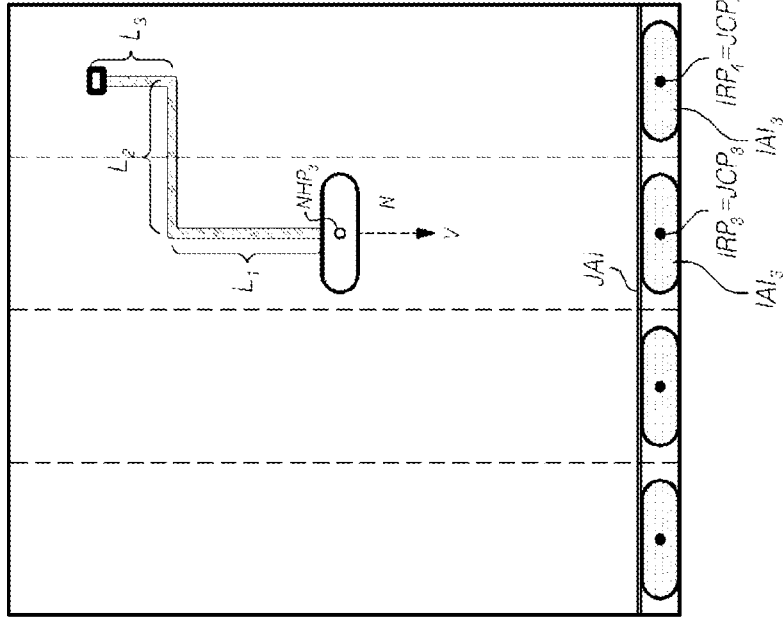
FIGS. 12A and 12B are diagrams exemplarily illustrating a game screen for the description of a method for touch input by a user.
Figure 12:
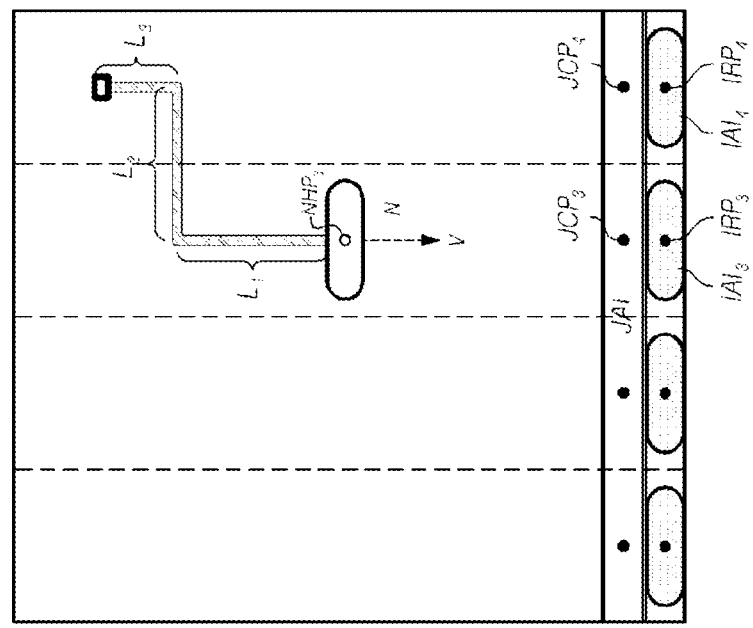
Figure 13:
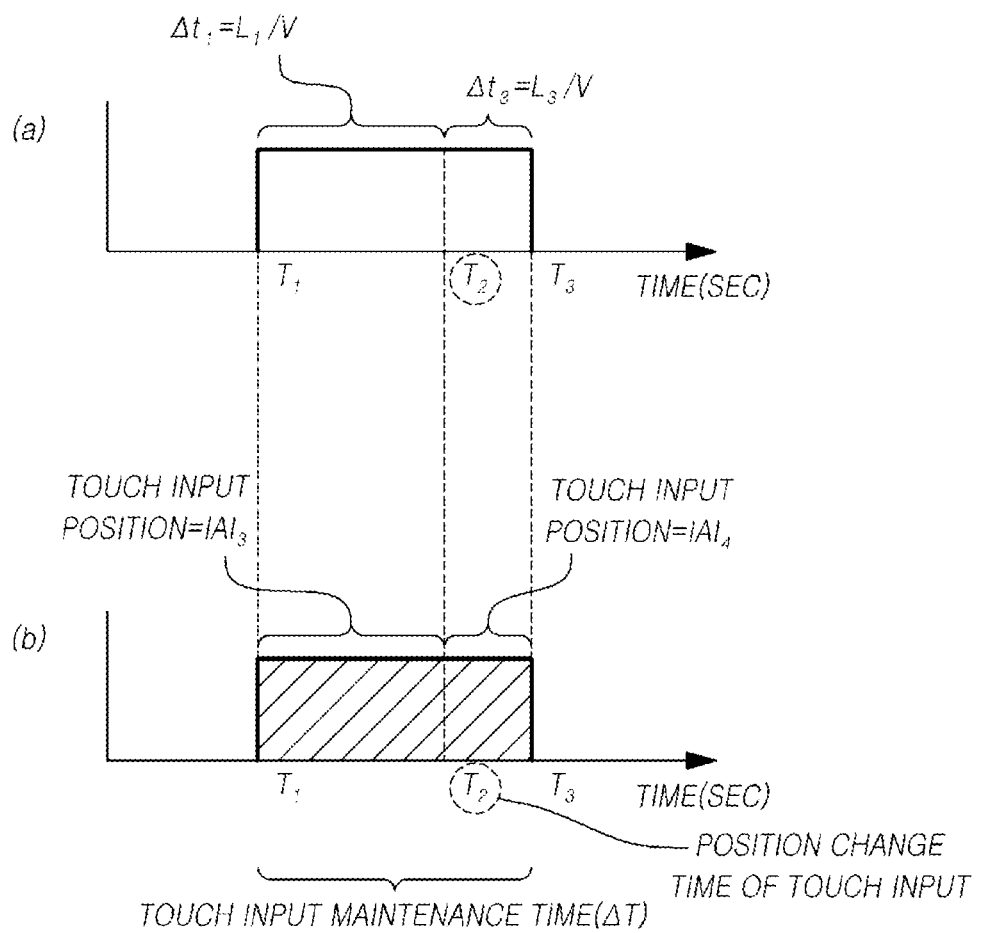
FIGS. 13A and 13B are a graph illustrating the reach of a note to a JAI according to a time and a graph illustrating the recognition of touch input according to a time in a case where the touch input is performed for the note displayed on the game screen of FIG. 12.

FIGS. 13A and 13B are a graph illustrating the reach of the note N with the JAI and a graph illustrating the recognition of the touch input according to a time in a case where the touch input is performed for the note N displayed on the game screen of FIG. 12. However, two graphs illustrated in FIGS. 13A and 13B are commonly applied to the game screens of FIGS. 12A and 12B.

FIG. 13A is a graph illustrating the time of the reach of the head and the subsequent tail of the note N with the JAI, that is, the reach of the note N with the JAI according to a time.

Referring to FIG. 13A, a time of reach of the NHP of the note N at the $JCP_3$ designated in the third track area is $T_1$ and the tail corresponding to the $L_1$ in the tail of the note N completely reaches the $JCP_3$ designated in the third track area during the $T_1$ to $T_2$. Then, the tail (i.e. the track area change point) corresponding to the $L_2$ in the tail of the note N reaches both the $JCP_3$ designated in the third track area and the $JCP_4$ designated in the fourth track area at the $T_2$. Then, the tail corresponding to the $L_3$ in the tail of the note N reaches the $JCP_4$ designated in the fourth track area during the $T_2$ to $T_3$.

That is, the $T_1$ is the time at which the NHP of the note N reaches the $JCP_3$ designated in the third track area and also is the time at which the tail corresponding to the $L_1$ in the entire tail of the note N first reaches the $JCP_3$ designated in the third track area.

The time section $T_1$ to $T_2$ is a time section during which the tail corresponding to the $L_1$ in the entire tail of the note N completely reaches the $JCP_3$ designated in the third track area.

Therefore, $\Delta t_1 (=T_2-T_1)$ is the time taken for the complete reach of the tail corresponding to the $L_1$ in the entire tail of the note N at the $JCP_3$ designated in the third track area, wherein $\Delta t_1 (=T_2-T_1)$ is a value obtained by dividing the length $L_1$ of the corresponding tail by the movement speed V.

$T_2$ is the time at which the tail (i.e., the track area change point) corresponding to the $L_2$ in the entire tail of the note N reaches both the $JCP_3$ designated in the third track area and the $JCP_4$ designated in the fourth track area, and also is the time at which the tail corresponding to the $L_3$ in the entire tail of the note N first reaches the $JCP_4$ designated in the fourth track area.

The time section $T_2$ to $T_3$ is the time section in which the tail corresponding to the $L_3$ in the entire tail of the note N completely reaches the $JCP_4$ designated in the fourth track area.

Therefore, $\Delta T_3 (=T_3-T_2)$ is a time taken for the complete reach of the tail corresponding to the $L_3$ in the entire tail of the note N at the $JCP_4$ designated in the fourth track area, wherein $\Delta T_3 (=T_3-T_2)$ is a value obtained by dividing the length $L_3$ of the corresponding tail by the movement speed V.

$T_3$ is the time at which the end point of the tail of the note N reaches the $JCP_4$ designated in the fourth track area, and also is the time at which the corresponding note N completely disappears.

FIG. 13B is a graph illustrating the recognition of the touch input according to the time on the assumption that the accuracy of the touch input of the user is 100% in the state of the movement of the note N as illustrated in FIG. 13A.

Referring to FIG. 13B, the touch input is first recognized at the $T_1$ at which the NHP of the note N reaches the $JCP_3$ designated in the third track area. The recognized touch input should be maintained until the tail of the note N disappears, that is, up to the $T_3$ by which the length ($L=L_1+L_2+L_3$) of the tail completely has reached the corresponding JCP of the JAI. That is, $\Delta T=T_3-T_1$ is the maintenance time of the touch input in the entire note.

$T_1$ is the time at which the recognition of the touch input starts in the reach of the NHP of the note N with the $JCP_3$ designated in the third track area.

$T_1$ to $T_2$ is the time section in which the user maintains the touch input until the reach of the tail corresponding to the $L_1$ in the entire tail of the note N with the $JCP_3$ designated in the third track area so that the maintained touch input is recognized. That is, the user has to continuously press the $IAI_3$ of the third track area during $\Delta t_1 (=T_2-T_1)$.

Since $T_2$ is the time at which the track area change point (the tail corresponding to the length $L_2$) of the note N reaches both the $JCP_3$ designated in the third track area and the $JCP_4$ designated in the fourth track area, $T_2$ corresponds to the time at which the touch input, which is generated through the user's drag of the touch from the position of the $IAI_3$ of the third track area to the position of the $IAI_4$ of the fourth track area without detachment of the user's touch from the touch screen, in order to change the touch input from the third track area to the fourth track area, is recognized.

$T_2$ to $T_3$ is the time section in which the user maintains the touch input until the reach of the tail corresponding to the $L_3$ in the entire tail of the note N with the $JCP_4$ designated in the fourth track area, so that the maintained touch input is recognized. That is, the user has to continuously press the position of the $IAI_4$ of the fourth track area during $\Delta T_3 (=T_3-T_2)$.

$T_3$ is the time at which the end point of the tail of the note N reaches the $JCP_4$ designated in the fourth track area, so that the touch input maintained from the $T_1$ is completed and thus the recognition of the touch input is completed.

Meanwhile, the touch input maintenance time $\Delta T$ in the entire note is defined by equation (1) below.

$$\Delta T = \frac{L}{V} = T_{Nend} - T_{Nstart} \qquad (1)$$

In equation (1), L refers to the length of the note N, V refers to the movement speed of the note N, $T_{Nstart}$ refers to the time of the reach of the NHP of the note N to the corresponding JCP, and $T_{Nend}$ refers to the time of the reach of a tail the position $NTP_{end}$ of the end point in the NTP of the note N to the corresponding JCP.

The length L of the note N and the movement speed V of the note N may be a unique value set in the game apparatus 100. In this case, the touch input maintenance time $\Delta T$ can be determined in a unique value by the length L of the note N and the movement speed V of the note N. The determined touch input maintenance time $\Delta T$ can be used for the judgment if the touch input is correctly maintained. That is, it is possible to judge if the touch input of the user is correctly maintained by comparing the touch input maintenance time $\Delta T$ that can be uniquely determined for the corresponding note N with the actually measured touch input maintenance time of the user.

Further, by using Equation (1), it is also possible to calculate the touch input maintenance time ($\Delta t_n$, wherein n is an identification number of a individual segment except for a individual segment corresponding to the track area change point) for each of individual segments of the tail of the note N.

In FIGS. 13A and 13B, the tail of the note N includes three individual segments including a first individual segment that is the tail corresponding to the length $L_1$, a second individual segment that is the tail corresponding to the length $L_2$, and a third individual segment that is the tail corresponding to the length $L_3$. Here, the second individual segment is the track area change point, so that the touch input maintenance time for the second individual segment is not calculated.

By using Equation (1), the touch input maintenance time $\Delta T_1$ for the first individual segment and the touch input maintenance time $\Delta T_3$ for the third individual segment are defined by equation (2) below.

$$\Delta t_1 = \frac{L1}{V}, \text{ and} \qquad (2)$$
$$\Delta t_3 = \frac{L3}{V}$$

In Equation (2), $L_1$ is the length of the first individual segment, $L_3$ is the length of the third individual segment, and V is the movement speed of the note N. The relation between the touch input maintenance time for the entire note and the touch input maintenance time for each individual segment is defined as $\Delta T_1 = \Delta t_1 + \Delta T_3$.

The lengths $L_1$ and $L_3$ of each individual segment and the movement speed V of the note N may be a unique value set in the game apparatus 100, and the touch input maintenance time for each individual segment can be determined in a unique value by the length of each individual segment and the movement speed of the note N.

By using the aforementioned characteristic, it is possible to judge if the position change of the touch input for the track area change point is correctly performed by using the touch input maintenance time for each individual segment. For example, referring to FIG. 12, the time of the reach of the NHP of the note N to the corresponding $JCP_3$ is measured, a time at which the position of the maintained touch input is changed from the $IRP_3$ to the $IRP_4$ is measured, it is identified if the difference value between two measured times corresponds to the $\Delta t_1$ (the touch input maintenance time for the first individual segment), and when it is identified that the difference value between two measured times corresponds to the $\Delta t_1$, it is judged that the position change of the touch input for the track area change point has been correctly performed.

Figure 14:
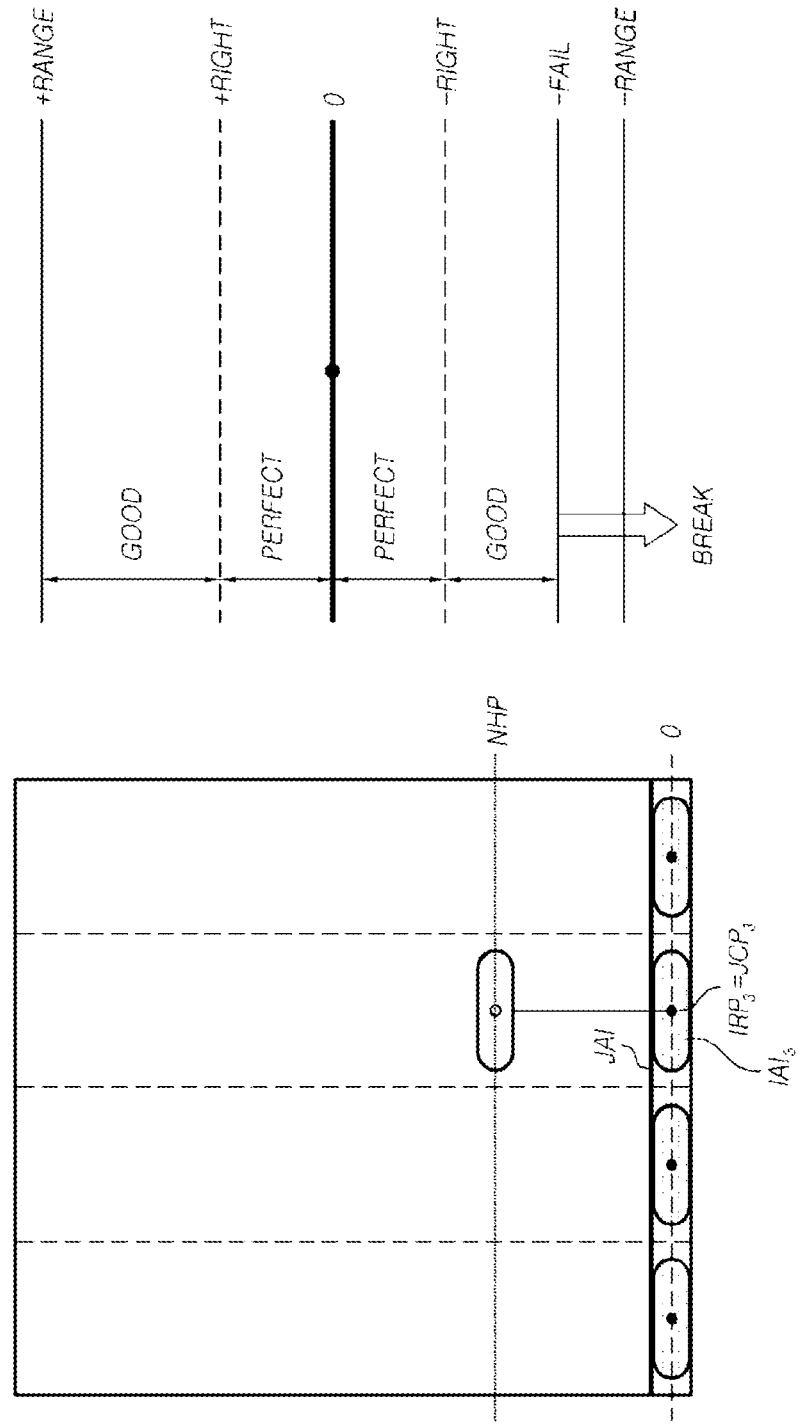
FIG. 14 is a diagram illustrating a basic rule of a judgment method.

FIG. 14 is a diagram illustrating a basic rule of the judgment method.

According to the basic rule of the judgment method, the touch input position at the touch input time of the recognized touch input is recognized, a distance value between the JCP corresponding to the recognized touch input position and the position of the note N at the touch input time of the recognized touch input is calculated, and then the judgment is performed based on the calculated distance value.

In the application of the basic rule of the judgment method to the game screen illustrated in the left side of FIG. 14, when the touch input position of the recognized touch input at the touch input time of the recognized touch input is recognized, it is possible to recognize that the touch input is performed in the IA indicated with the $IAI_3$ of the third track area and the $IRP_3$ in the IA indicated with the $IAI_3$ of the third track area is the touch input position.

In the exemplified game screen, it is assumed that the IRP and the JCP for each track area are designated in the identical position, so that the $IRP_3$ of the third track area is identical to the $JCP_3$ of the third track area. The distance value between the $JCP_3$ and the position (here, the NHP) of the note N at the touch input time is obtained, it is determined a range, to which among ranges defined by +RANGE, +RIGHT, criterion (0), −RIGHT, −FAIL, and −RANGE the obtained distance value belongs, and judgment result information (e.g. GOOD, PERFECT, and BREAK) corresponding to the determined range is selected and outputted.

Herein, "±RANGE" is a constant for setting an effective range of the touch input and is identically applied to a front point and a rear point of the JCP that is the criterion (0). "±RIGHT" is a constant for setting a range of judgment of the highest accuracy (e.g. PERFECT judgment) and is identically applied to a front point and a rear part of the JCP that is the criterion(0). "−FAIL" is a constant set for processing the failure (BREAK judgment) of the touch input with respect to a case in which the note N passes the JCP so that the touch input is not performed within a predetermined range, and can be set as a constant closer to the criterion (0) than −RANGE and applied to a rear part of the JCP that is the criterion (0).

In the above description, the judgment method based on the distance has described, but can be applied in accordance with the time. In the event that the judgment method is performed in accordance with the time, it is determined a range, to which among ranges defined by +RANGE, +RIGHT, criterion (0), −RIGHT, −FAIL, and −RANGE the difference value between the criterion touch input time, at which the touch input must be recognized when the note N correctly reaches the JCP, and the touch input time, at which the touch input is actually recognized, belongs, and judgment result information (e.g. GOOD, PERFECT, and BREAK) corresponding to the determined range is selected and outputted.

An example of the setting of the constant that is the criterion for judgment is described below. ±RANGE can be set as ±300 ms, −FAIL can be set as −260 ms, and ±RIGHT can be set as ±100 ms. "+" refers to the point in front of the JCP that is the criterion (0) and "−" refers to the point behind the JCP of the criterion (0).

By using the basic rule of the aforementioned judgment method, the judgment for the short note will be described with reference to FIGS. 15A and 15B, and the judgment for the long note and the slide note will be described with reference to FIG. 16.

Figure 15:
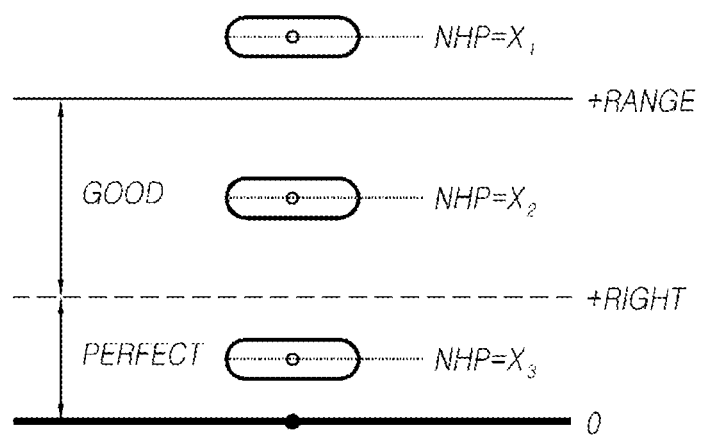
FIGS. 15A and 15B are diagrams illustrating a judgment method for a short note.
Figure 15:
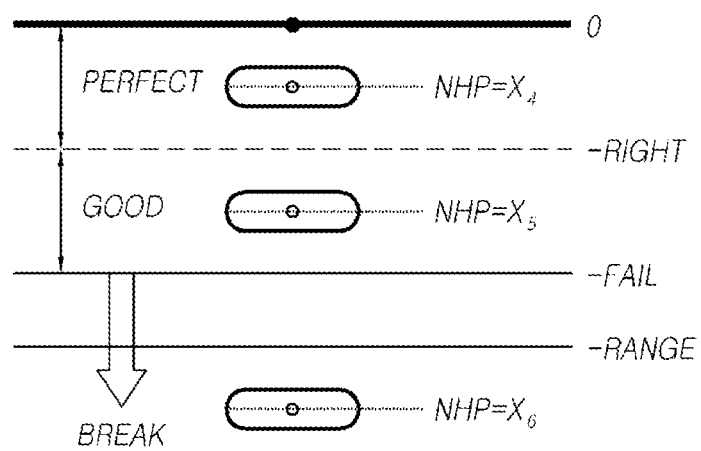

FIGS. 15A and 15B are diagrams illustrating the judgment method for the short note.

As described above with reference to FIG. 14, when the touch input for the short note is recognized, the touch input position of the recognized touch input and the position of the note N are recognized, a distance value between the JCP determined from the recognized touch input position and the recognized position of the note N (the note N is the short note, so that the position of the note N is the NHP) is calculated, and the judgment in accordance with the distance is performed based on the calculated distance value. Further, it is also possible to calculate a difference value between the criterion touch input time, at which the touch input must be input when the short note correctly reaches the JCP, and the touch input time at which the touch input is actually performed, and judge the touch input in accordance with the time based on the calculated difference value.

FIG. 15A is a diagram illustrating the judgment method in a case where the touch input is performed before the note N passes the JCP that is the criterion (0).

Referring to FIG. 15A, the distance value D between the JCP obtained from the touch input position and the NHP at the touch input time is calculated, and when the NHP is $X_1$, i.e., distance value D>+RANGE, the judgment rule is not applied to the touch input so that the judgment is not performed, when the NHP is $X_2$, i.e., +RIGHT<distance value D≤+RANGE, the judgment result is determined as GOOD, and when the NHP is $X_3$, i.e., criterion (0)≤distance value D≤+RIGHT, the judgment result is determined as PERFECT.

Further, the judgment can be performed as described below. The NHP at the touch input time is recognized, and when the NHP is $X_1$, i.e., NHP>+RANGE, the judgment rule is not applied to the touch input so that the judgment is not performed, when the NHP is $X_2$, i.e., +RIGHT<NHP≤+RANGE, the judgment result is determined as GOOD, and when the NHP is $X_3$, i.e., criterion (0)≤NHP≤+RIGHT, the judgment result is determined as PERFECT.

Further, the difference value D between the criterion touch input time, at which the touch input has to be recognized when the corresponding note N reaches the corresponding JCP, and the touch input time, at which the touch input is actually recognized, is calculated, and when the NHP is $X_1$, i.e., distance value D>+RANGE, the judgment rule is not applied to the touch input so that the judgment is not performed, when the NHP is $X_2$, i.e., +RIGHT<distance value (D)≤+RANGE, the judgment result is determined as GOOD, and when the NHP is $X_3$, i.e., criterion (0)≤distance value (D)≤+RIGHT, the judgment result is determined as PERFECT.

FIG. 15B is a diagram illustrating the judgment method with respect to the case in which the touch input is performed after the note N passes the JCP of the criterion (0).

Referring to FIG. 15B, the distance value (D) between the JCP obtained from the touch input position and the NHP at the touch input time is obtained, and when the NHP is $X_4$, i.e., criterion (0)≤distance value (D)≤−RIGHT, the judgment result is determined as PERFECT, when the NHP is $X_5$, i.e., −RIGHT<distance value (D)<−FAIL (or −RANGE), the judgment result is determined as GOOD, and when the NHP is $X_6$, i.e., distance value (D)≥−FAIL (or −RANGE), the judgment result is determined as BREAK (touch input failure).

Further, the judgment can be performed as described below. The NHP is recognized at the touch input time, and when the NHP is $X_4$, i.e., the criterion (0)≤ the NHP≤−RIGHT, the judgment result is determined as PERFECT, when the NHP is $X_5$, i.e., −RIGHT< the NHP<−FAIL (or −RANGE), the judgment result is determined as GOOD, and when the NHP is $X_6$, i.e., the NHP≥−FAIL (or −RANGE), the judgment result is determined as BREAK (touch input failure).

Further, the difference value D between the criterion touch input time, at which the touch input has to be recognized when the corresponding note N reaches the corresponding JCP, and the touch input time, at which the touch input is actually recognized, is calculated, and when the NHP is $X_4$, i.e., criterion (0)≤difference value (D)≤−RIGHT, the judgment result is determined as PERFECT, when the NHP is $X_5$, i.e., −RIGHT< the difference value (D)<−FAIL (or −RANGE), the judgment result is determined as GOOD, and when the NHP is $X_6$, i.e., the difference value (D)≥−FAIL (or −RANGE), the judgment result is determined as BREAK (touch input failure).

Figure 16:
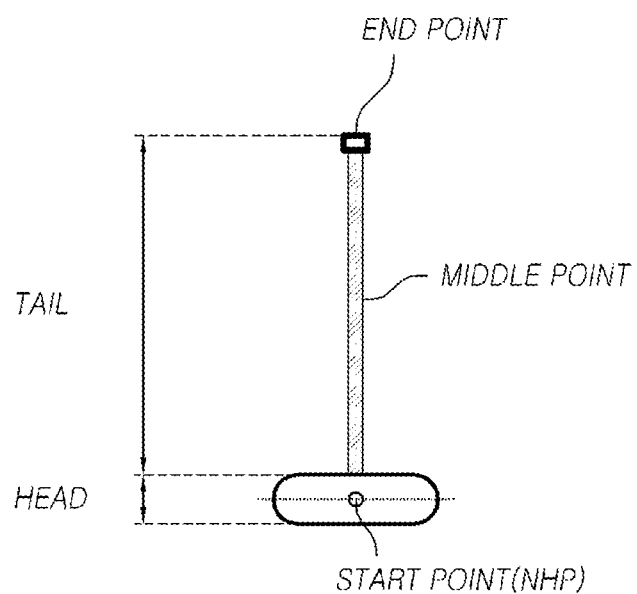
FIG. 16 is a diagram exemplarily illustrating a long note for describing a judgment method for the long note.

FIG. 16 is a diagram exemplarily illustrating the long note for describing the judgment method for the long note.

FIGS. 17A and 17B are diagrams illustrating the judgment method for the long note.

FIG. 17A is a diagram illustrating the judgment method of the touch input for the start point in the head of the long note of FIG. 16. The judgment method of the touch input for the start point in the long note is identical to the judgment method of the touch input of the short note aforementioned with reference to FIGS. 15A and 15B.

FIG. 17B is a diagram illustrating the method for judging success of the maintenance of the touch input at the middle point in the tail of the long note of FIG. 16. In the tail of the long note, the touch input of the head has to be maintained by the length of the tail.

Referring to FIG. 17B, when the touch input is maintained in the entirety (from the start point to the end point) of the tail of the note N, it is judged as the touch input maintenance success. When the touch input is not maintained in the entirety (from the start point to the end point) of the tail of the note N, it is judged as the touch input maintenance failure.

Even when the touch input is judged as the touch input maintenance failure, if the touch input maintenance failure includes a partial success in the touch input maintenance (maintained touch input) with a failure just before the end point, it is possible, by counting the maintained touch input successful up to the middle point, to judge the touch input as a partial touch input maintenance success. The judgment of the partial touch input maintenance success can achieve a more detailed judgment for the touch input.

The maintenance section of the touch input can be judged through calculating the number of judgments of the start point of the head in number equal to the number of judgments for each length of the note N.

The number of judgments for each length of the note N functions to promote the continuous judgment according to the number of judgments for each length of the corresponding note N in the judgment of the maintained touch input for the long note, the slide note, etc. The number of judgments for each length of the note N functions to promote the continuous judgment in the middle point, as well as in the start point and the end point of the long note or the slide note. Therefore, it is possible to continuously output the judgment result of the part until the end of the single long note or slide note.

When the judgment is processed through the calculation of the number of judgments for each length of the note N, in the event of the failure of the touch input maintenance at the end point, the success result up to the middle point may be counted by the judgment for each length of the note N, so as to judge the touch input of the note N as a partial success.

When the judgment is not processed through the calculation of the number of judgments for each length of the note N, in the event of the failure of the touch input maintenance at the end point, the touch input for the corresponding note N is judged as failure.

On the assumption that the number of judgments increases by one per 0.3 seconds of the input maintenance time, the number J of judgments for each length of the note N for the input maintenance time M (secs) is defined by equation (3) below.

$$J = \frac{M}{0.3}, \text{ wherein } 0 \leq M \qquad (3)$$

When the touch input maintenance is judged as a success, it is possible to output the PERFECT judgment or the GOOD judgment. When the touch input maintenance is judged as a failure, it is possible to output the BREAK judgment.

Figure 17:
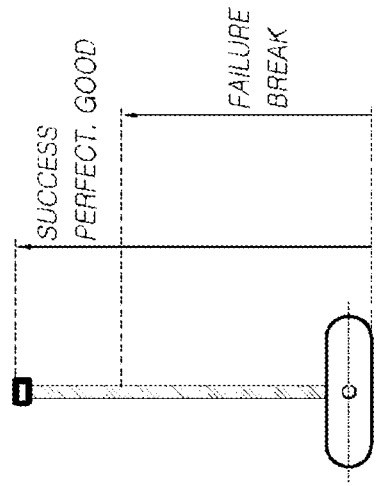
FIGS. 17A and 17B are diagrams illustrating a judgment method for the long note.
Figure 17:
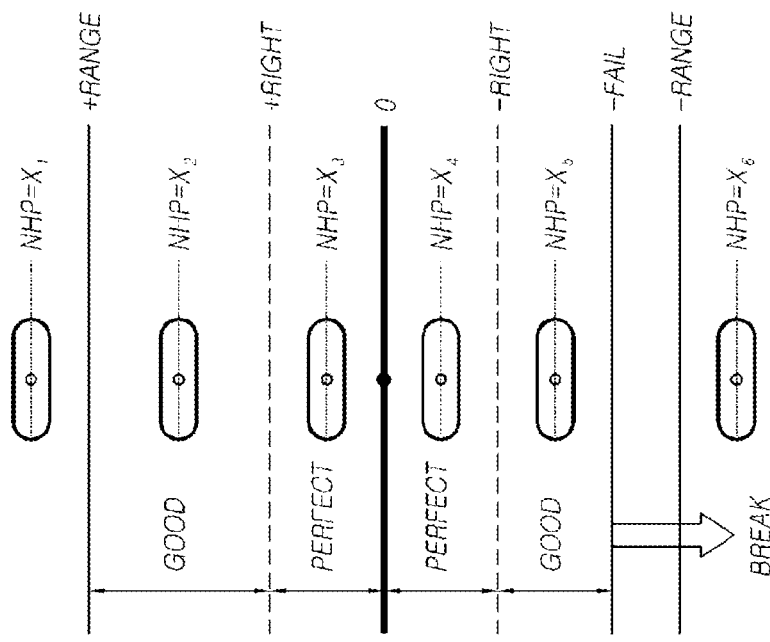

It is possible to judge the touch input for the slide note by using the judgment method for the long note aforementioned with reference to FIG. 17. However, it requires the further judgment if the timing of the position change of the touch input and the changed position of the touch input with respect to the track area change point of the tail of the slide note are correct.

During the progress of the game according to the embodiment of the present invention, it is possible to output a graphic effect related to the touch input or the judgment on the game screen.

Figure 18:
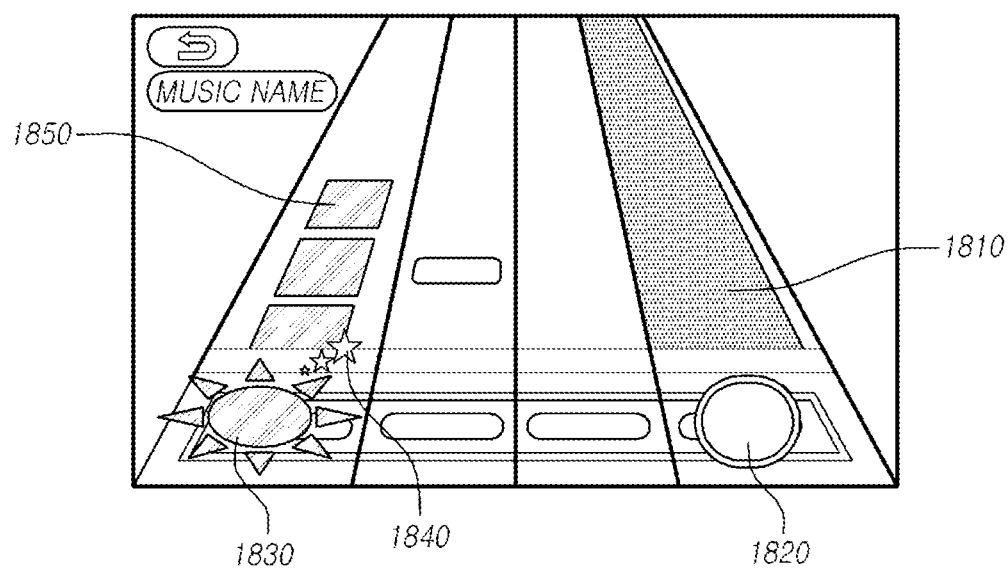
FIGS. 18 and 19 are diagrams exemplarily illustrating various graphic effects outputted on a game screen.
Figure 19:
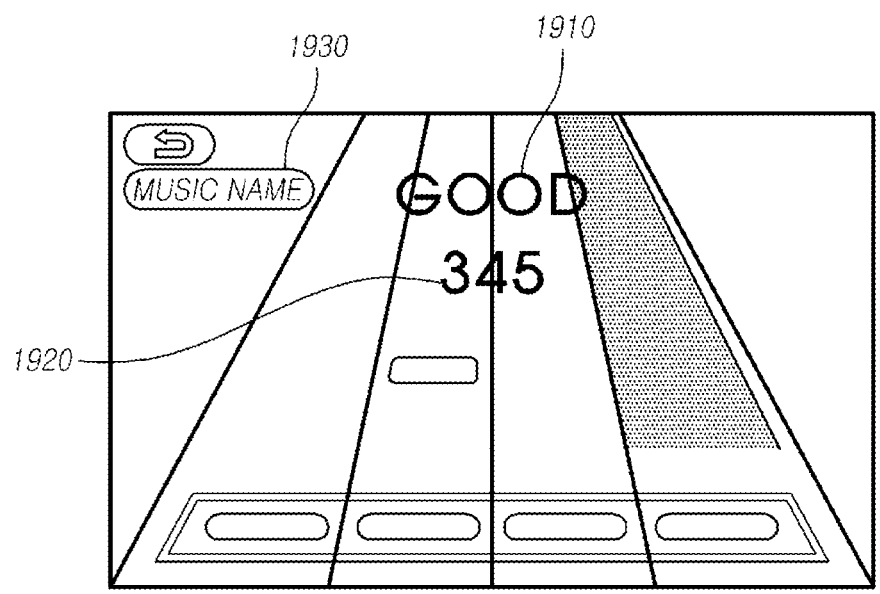

FIGS. 18 and 19 are diagrams exemplarily illustrating various graphic effects outputted on the game screen.

Referring to FIG. 18, when the user touches a position of the IAI and the touch input is recognized, the game apparatus 100 can display a touch mark 1820 in a specific shape (e.g. a round shape) in the a corresponding position touched by the user and output a graphic effect of displaying a press beam 1810 in a specific shape (e.g. a straight line shape) on a corresponding track area together with the touch mark 1820.

Further, the game apparatus 100 can output a graphic effect according to a judgment result for the touch input of the user. As illustrated in FIG. 18, the graphic effect outputted according to the judgment result includes the output the graphic effect 1830 of Cool Bomb 1830 exploding the corresponding note N and the graphic effect in a specific shape (e.g. a star shape) of particles 1840 outputted together with the Cool Bomb 1830 for the judgment result, such as the PERFECT, COOL, and GOOD judgments indicative of the correct touch input.

Further, referring to FIG. 18, the game apparatus 100 can output an equalizer graphic effect 1850 when the touch input of the user is recognized.

Referring to FIG. 19, it is possible to output a judgment graphic 1910 in accordance with the judgment result with respect to the accuracy or success or failure of the touch input on the game screen.

For example, the judgment graphic 1910 may include one of "PERFECT", "COOL", "GOOD", and "BREAK". It is possible to output a numerical graphic 1920 of several ciphers having various meaning, such as a score, together with the judgment graphic 1910. The judgment graphic 1910 and the numerical graphic 1920 can be outputted in their unique color.

Further, as illustrated in FIG. 19, it is possible to display a music title 1930 reproduced during the game on the game screen. When the music title 1930 is long, it may be scrolled for display.

Figure 20:
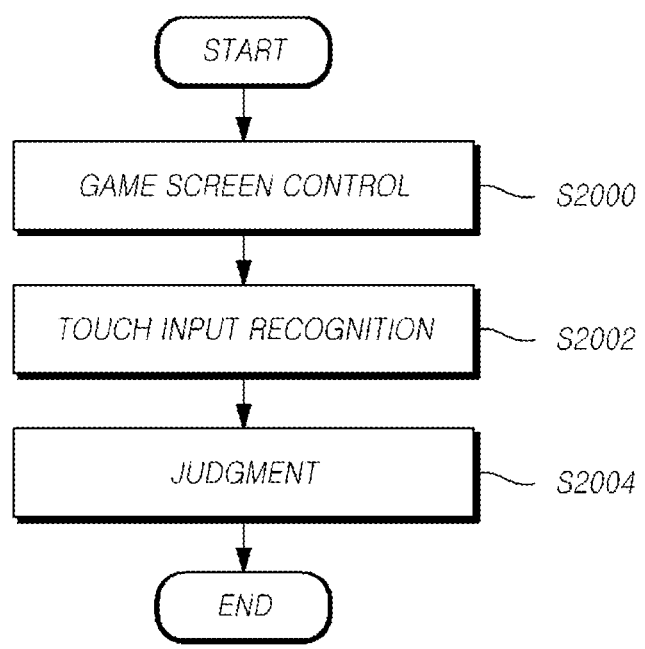
FIG. 20 is a flowchart illustrating a game method by a game apparatus according to an embodiment of the present invention.

FIG. 20 is a flowchart illustrating a game method provided by the game apparatus 100 according to an embodiment of the present invention.

Referring to FIG. 20, the game method comprises a display control step (S2000), an input recognition step (S2002) and a judgment step (S2004). In S2000, the game apparatus 100 controls a division of a game screen displayed on a touch screen into multiple track areas, a showing of a Judgment Area Indication (JAI) on the game screen, and a showing of a note while moving toward the Judgment Area Indication (JAI), wherein the note includes a head and a tail, wherein the tail is connected to the head in a predetermined length, and wherein the tail includes at least one track area change point. In S2002, the game apparatus 100 recognizes a touch input through the touch screen. In S2004, the game apparatus 100 judges at least one of an accuracy, success, or failure of the touch input is judged, based on a recognition result of the touch input and states of the note and the Judgment Area Indication (JAI).

As described above, the note N includes the head and the tail, in which the tail is connected with the head in a predetermined length, so that the tail is displayed over at least two track areas among the multiple track areas.

The aforementioned game method according to the embodiment of the present invention can be implemented by a program and be recorded in a computer-readable medium containing a set of instructions adapted to perform the aforementioned game method.

The medium comprises at least one instruction adapted to control a division of a game screen displayed on a touch screen into multiple track areas, a showing of a Judgment Area Indication (JAI) on the game screen, and a showing of a note while moving toward the Judgment Area Indication (JAI), wherein the note includes a head and a tail, wherein the tail is connected to the head in a predetermined length, and wherein the tail includes at least one track area change point.

The medium comprises at least one instruction adapted to recognize a touch input through the touch screen.

And the medium comprises at least one instruction adapted to judge at least one of an accuracy, success, or failure of the touch input, based on a recognition result of the touch input and states of the note and the Judgment Area Indication (JAI).

For example, the recording medium readable by a computer includes ROM, RAM, CD-ROM, a magnetic tape, a floppy disk, and an optical data storing device. Further, the recording medium readable by the computer is dispersed in a computer system or a server connected through a network, so that a computer readable code can be stored in the recording medium and executed in a dispersion scheme.

Further, a functional program, a code, and code segments for implementing the present invention can be easily conceived by programmers skilled in the art of the present invention.

When the game apparatus 100 is a communication device, such as a smart phone, capable of communicating with the computer system or the server through the network, the game apparatus 100 can communicate with the computer system or the server storing the recording medium in which the program for executing the game method according to the embodiment of the present invention is stored and execute the corresponding game by reading the program recorded in the recording medium.

For example, the recording medium recording the program for executing the game method according to the embodiment of the present invention has a stored application program, and can be stored in a web server that provides a desired terminal with the application program and utilized for web store service technology. Further, the recording medium recording the program for executing the game method according to the embodiment of the present invention can be utilized for game service technology stored in a game server, etc., and provided to the game apparatus 100.

Figure 21:
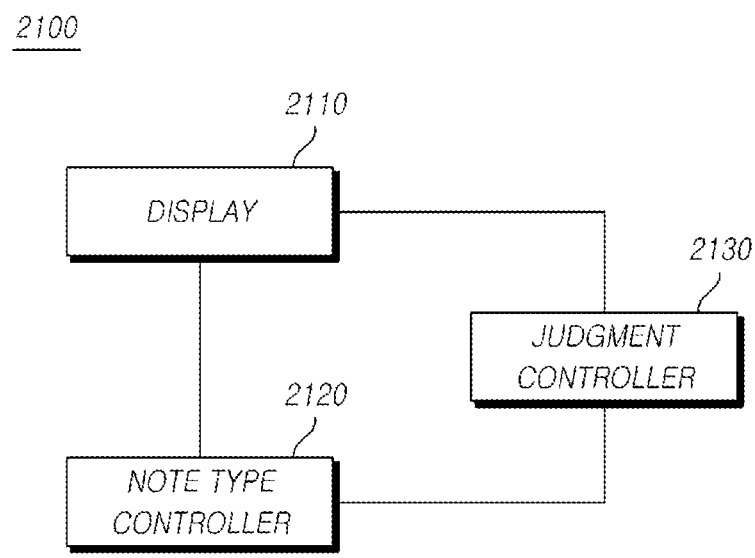
FIG. 21 is a block diagram illustrating a game apparatus according to another embodiment of the present invention.

FIG. 21 is a block diagram illustrating a game apparatus 2100 according to another embodiment of the present invention.

Referring to FIG. 21, the game apparatus 2100 according to another embodiment of the present invention comprises a display 2110 configured to display a game screen, the game screen being divided into multiple track areas and showing a note, the note including an input start indication part and an input maintenance indication part, a note type controller 2120 configured to determine a note type of the note shown on the game screen and to control a showing of at least one of the input start indication part or the input maintenance indication part according to the determined note type, and a judgment controller 2130 configured to judge at least one of an accuracy, success, or failure of an operation based on an inputted operation signal and a position of the note.

The note type of the note N determined by the note type controller 2120 includes one among a first note type, a second note type, a third note type, and a fourth note type.

The first note type is a note type including the input start indication part displayed on the single track area and the input maintenance indication part having a length of zero. The second note type is a note type including the input start indication part displayed on the single track area and the input maintenance indication part displayed on the single track area. The third note type is a note type including the input start indication part displayed on the single track area and the input maintenance indication part displayed over at least two track areas. The fourth note type is a note type including the input start indication part displayed over at least two track areas and the input maintenance indication part displayed over at least two track areas in a zigzag shape.

Also, the note N in the first note type is referred to as the "short note", the note N in the second note type is referred to as the "long note", the note N in the third note type is referred to as the "slide note", and the note N in the fourth note type is referred to as the "rub note".

The input maintenance indication part of the note N can be connected with a point in a predetermined direction from the input start indication part and be displayed in a predetermined length.

Figure 22:
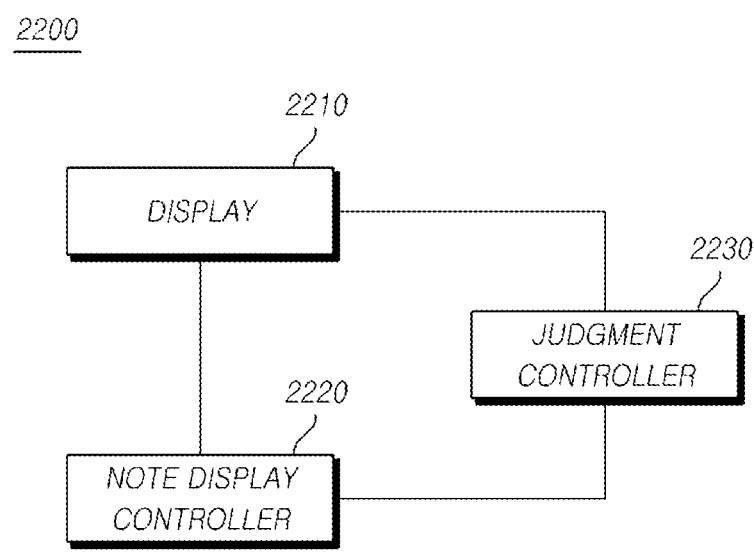
FIG. 22 is a block diagram illustrating a game apparatus according to another embodiment of the present invention.

FIG. 22 is a block diagram illustrating a game apparatus 2200 according to another embodiment of the present invention.

Referring to FIG. 22, the game apparatus 2200 according to another embodiment of the present invention comprises a display 2210 configured to display a game screen, the game screen being divided into multiple track areas and showing a first note and at least one second note, the first note including a first input start indication part and a first input maintenance indication part shown over at least two track areas, and the second note including a second input start indication part and a second input maintenance indication part having a length of zero or more, and a note display 2220 controller configured to control a showing of at least one selected from the first note and the at least one second note on the game screen, thereby preventing at least one of the first input start indication part or the first input maintenance indication part of the first note and at least one of the second input start indication part or the second input maintenance part of the at least one second note from simultaneously reaching an judgment criterion position in a same track area.

Figure 23:
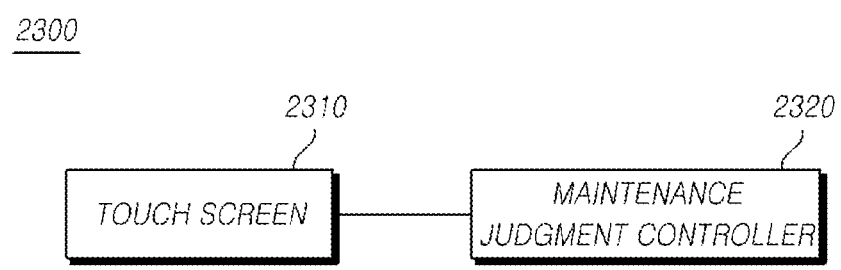
FIG. 23 is a block diagram illustrating a game apparatus according to another embodiment of the present invention.

FIG. 23 is a block diagram illustrating a game apparatus 2300 according to another embodiment of the present invention.

Referring to FIG. 23, the game apparatus 2300 according to another embodiment of the present invention comprises a touch screen 2310 configured to display a game screen, the game screen being divided into multiple track areas and showing a note, and to recognize a touch input, wherein the note includes an input start indication part and an input maintenance indication part and wherein the input maintenance indication part is shown over at least two track areas among the multiple track areas, and a maintenance judgment controller 2320 configured to judge if the recognized touch input is maintained from a first time when the input start indication part reaches a judgment criterion position in the track area among the multiple track areas up to a second time when the input maintenance indication part reaches the judgment criterion position of at least one track area among the multiple track areas, the recognition of the touch input being started at the first time, thereby judging at least one of an accuracy, success, or failure of the touch input of the note, and further judge if a position of the recognized touch input changes according to a showing of a track area change point while maintaining a state of the recognized touch input, from the first time when the input start indication part reaches the judgment criterion position in the track area among the multiple track areas up to a third time when the track area change point of the input maintenance indication part shown over the at least two track areas reaches the judgment criterion position of the at least two track areas, thereby judging at least one of an accuracy, success, or failure of the touch input of the note.

Figure 24:
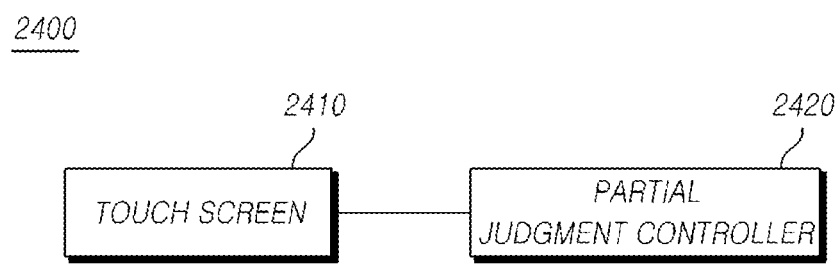
FIG. 24 is a block diagram illustrating a game apparatus according to another embodiment of the present invention.

FIG. 24 is a block diagram illustrating a game apparatus 2400 according to another embodiment of the present invention.

Referring to FIG. 24, the game apparatus 2400 according to another embodiment of the present invention comprises a touch screen 2410 configured to display a game screen and to recognize a touch input, the game screen being divided into multiple track areas and showing a note, and the note including an input start indication part and an input maintenance indication part, and a partial judgment controller 2420 configured to judge an input maintenance time during which the recognized touch input is maintained from a first time when the input start indication part reaches a judgment criterion position of the track area among the multiple track areas up to a second time when the input maintenance indication part reaches the judgment criterion position of at least one track area among the multiple track areas, the recognition of the touch input being started at the first time, calculate the number of judgments for each length of the note based on the judged input maintenance time, and judge at least one of an accuracy, success, or failure of the touch input as many as the calculated number of judgments, thereby partially judging the touch input in the input maintenance indication part.

Figure 25:
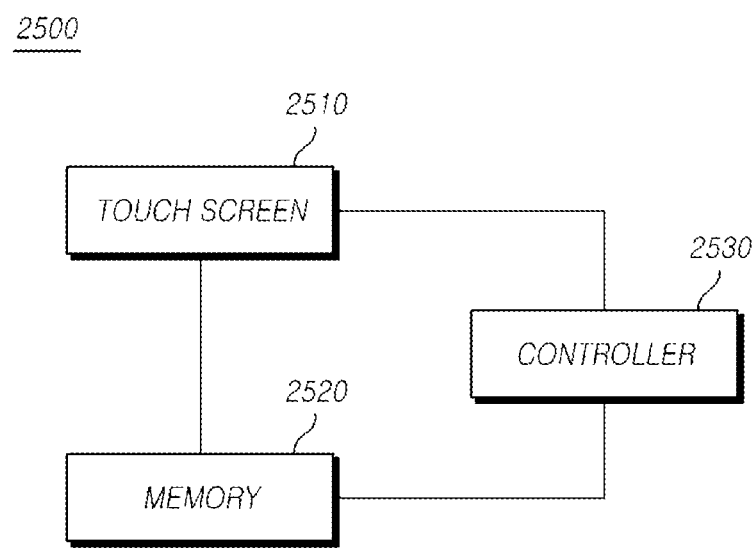
FIG. 25 is a block diagram illustrating a game apparatus according to another embodiment of the present invention.

FIG. 25 is a block diagram illustrating a game apparatus 2500 according to another embodiment of the present invention.

Referring to FIG. 25, the game apparatus 2500 according to another embodiment of the present invention comprises a touch screen 2510 configured to display a game screen showing a note, and to recognize a touch input, a memory 2520 configured to store a preset criterion touch input time at which the touch input has to be performed when a position of the note corresponds to a judgment criterion position designated in advance with respect to each of the notes used in a game, and a controller 2530 configured to judge at least one of an accuracy, success, or failure of the touch input of the note, based on a difference value between a touch input time of the touch input recognized through the touch screen and the preset criterion touch input time of the note.

The controller 2530 determines a range, including the different value, among multiple ranges corresponding to each of multiple different judgment result information, and shows the judgment result information corresponding to the determined range on the game screen in a predetermined display scheme or outputs the judgment result information to a predetermined audio.

The input start indication part of the note N can be displayed like the aforementioned head of the note N and the input maintenance indication part of the note N can be displayed like the aforementioned tail of the note N.

As described above, the present invention can more variously control the display of the elements of the game screen, thereby providing games capable of employing various game schemes. In this respect, the present invention can further spur the interest in the game.

Further, the present invention can provide the game which can more finely, variously, and accurately judge the operation of the user.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardware. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A game apparatus, comprising:
   a game screen controller configured to
   display a game screen,
   divide the game screen into a plurality of track areas,
   display the track areas, display a judgment area indicator overlapped with the track areas, and display a note on at least one of the track areas while the note is moving toward the judgment area indicator, wherein the note includes a head, and a tail connected to the head in a predetermined length and including at least one track area change point;

a touch input recognition unit configured to recognize the touch input through the touch screen; and a judgment unit configured to judge at least one of an accuracy, success, or failure of the touch input, based on a recognition result of the touch input and states of the note and the judgment area indicator.

2. The apparatus of claim 1, wherein the judgment unit is further configured to judge at least one of an accuracy and success of the touch input, based on whether the touch input is started at a time that the head reaches the judgment area indicator, and whether the recognized touch input is maintained until the entirety of the tail reaches the judgment area indicator, and wherein the judgment unit is further configured to judge the at least on of the accuracy and success of the touch input, when the track area change point in the tail is shown over at least two of the track areas, and when the track area change point reaches the judgment area indicator, further based on whether a position of the recognized touch input changes according to a showing of the track area change point while the recognized touch input is maintained.

3. The apparatus of claim 1, wherein the judgment unit is further configured to judge an input hold time during which-the recognized touch input is maintained, wherein the input hold time is from a first time when the head reaches the judgment area indicator to a second time when the entirety of the tail reaches the judgment area indicator, wherein the touch input recognition unit is further configured to recognize the touch input from the first time, and wherein the judgment unit is further configured to calculate a judgment number for each predetermined length of the note based on the judged input hold time, and repeat judge at least one of an accuracy, success, or failure of the touch input as many time as the calculated judgment number.

4. The apparatus of claim 1, wherein the game screen controller is further configured to display the judgment area indicator as a fixed judgment area indicator or a moving judgment area indicator.

5. The apparatus of claim 1, wherein the game screen controller is further configured to designate a judgment position on the judgment area indicator for each of the track areas, wherein the judgment position is a criterion for judgment of the touch input for each track area, and display the judgment area indicator over all of the track areas or in each of the track areas.

6. The apparatus of claim 5, wherein the game screen controller is further configured to display the note so that the head and tail of the note are not reached to one judgment position simultaneously with a head or tail of another note.

7. The apparatus of claim 5, wherein the game screen controller is further configured to designate an input area for the touch input for each of the track areas, and designate a single input representative position for each designated input area.

8. The apparatus of claim 7, wherein the game screen controller configured to display an input area indicator on the designated input area for each of the track areas.

9. The apparatus of claim 7, wherein, when the judgment position and the input representative position are designated in the same position for each of the track areas, the judgment unit is further configured to identify a touch input time and the input representative position of the touch input through the corresponding input area from the recognition result of the touch input, and judge at least one of an accuracy, success, or failure of the touch input of the note, based on a distance value between the identified input representative position and a position of the note, at the identified touch input time, or the judgment unit is further configured to identify the touch input time of the touch input through the corresponding input area from the recognition result of the touch input, and judge at least one of an accuracy, success, or failure of the touch input of the note based on a difference value between the identified touch input time and a criterion touch input time, the criterion touch input time being preset for the note.

10. The apparatus of claim 7, wherein, when the judgment position and the input representative position are designated in different positions for each of the multiple track areas, the judgment unit is further configured to identify a touch input time and the input representative position of the touch input through the corresponding input area from the recognition result of the touch input, and judge at least one of an accuracy, success, or failure of the touch input of the note, based on a distance value between the judgment criterion position corresponding to the identified input representative position and a position of the note at the identified touch input time, or the judgment unit is further configured to identify the touch input time of the touch input through the corresponding input area from the recognition result of the touch input, and judge at least one of an accuracy, success, or failure of the touch input of the note based on a difference value between the identified touch input time and a criterion touch input time, the criterion touch input time being preset for the note.

11. The apparatus of claim 10, wherein the position of the note is one of a position of the head and a position of the tail, and wherein the criterion touch input time includes a first touch input time being preset for a case where the head position is identical to the judgment position designated in the track area corresponding to the head position, and a second touch input time being preset for a case where the tail position is identical to the judgment position designated in the track area corresponding to the tail position.

12. The apparatus of claim 1, wherein the game screen controller is further configured to display the head of the note on the track area or over at least two track areas, among the track areas.

13. A game method of a game apparatus, the method comprising:
dividing a game screen into a plurality of track areas,
displaying the track areas on a touch screen;
displaying a judgment area indicator overlapped with the track areas on the game screen:
displaying a note on at least one of the track areas while the note is moving toward the judgment area indicator,
wherein the note includes
a head, and
a tail, connected to the head in a predetermined length, and including at least one track area change point;
recognizing the touch input through the touch screen; and
judging at least one of an accuracy, success, or failure of the touch input, based on a recognition result of the touch input and states of the note and the judgment area indicator.

14. A non-transitory computer-readable medium containing a set of instructions adapted to perform a game method, the medium comprising:
at least one instruction adapted to
divide a game screen into a plurality of track areas,
display the track areas on a touch screen,
display a judgment area indicator, on the game screen, and
display a note on at least one of the track areas while the note is moving toward the judgment area indicator,
wherein the note includes
a head, and
a tail, connected to the head in a predetermined length and including at least one track area change point;
at least one instruction adapted to recognize the touch input through the touch screen; and
at least one instruction adapted to judge at least one of an accuracy, success, or failure of the touch input, based on a recognition result of the touch input and states of the note and the judgment area indicator.

15. A game apparatus comprising:
a display configured to
display a game screen, the game screen being divided into multiple track areas and showing a note, the note including a head indicating input start and a tail indicating input maintenance;
a note type controller configured to determine a note type of the note shown on the game screen and to control a showing of at least one of the head or the tail according to the determined note type; and
a judgment controller configured to judge at least one of an accuracy, success, or failure of an operation based on an inputted operation signal and a position of the note,
wherein the determined note type comprises at least one of a first note type, a second note type, a third note type, or a fourth note type,
the first note type including the head shown on the track area and the tail having a length of zero
the second note type including the head shown on the track area and the tail shown on the track area,
the third note type including the head shown on the track area and the tail shown over at least two track areas, and
the fourth note type including the head shown over the at least two track areas and the tail shown over the at least two track areas in a zigzag shape.

16. A game apparatus comprising:
a touch screen configured to
display a game screen,
divide the game screen into a plurality of track areas,
display the track areas and a judgment area indicator overlapped with the divided track areas,
display a note on at least one of the track areas while the note is moving toward the judgment area indicator, and
recognize a touch input,
wherein the note includes a head indicating an input start and a tail indicating an input hold, and
wherein the tail is displayed over at least two track areas among the track areas; and
a judgment controller configured to
judge at least one of an accuracy and success of the touch input,
based on whether the recognized touch input is maintained from a first time that the head reaches a judgment position on a track area among the track areas to a second time that the tail reaches the judgment position of at least one track area among the track areas, and
judge the at least one of an accuracy and success of the touch input,
when a position of the recognized touch input is changed according to a displaying of a track area change point while maintaining the recognized touch input,
further based on whether the recognized touch input is maintained from the first time when the head reaches the judgment position in the track area among the track areas to a third time when the track area change point of the tail shown over the at least two track areas reaches the judgment position of the at least two track areas.

17. A game apparatus comprising:
a touch screen configured to
display a game screen,
divide the game screen into a plurality of track areas,
display the track areas, and
display a note on at least one of the track areas,
display a judgment area indicator overlapped with the track areas, and
recognize a touch input,
wherein the note includes a head indicating an input start and a tail indicating an input hold; and
a partial judgment controller configured to
judge an input hold time during the recognized touch input is maintained from a first time when the head reaches the judgment area a second time when the tail reaches the judgment area, wherein the recognition of the touch input being started at the first time, and
calculate a judgment number for each predetermined length of the note based on the-judged input hold time, and
repeat judge at least one of an accuracy, success, or failure of the touch input as many time as the calculated judgment number.

* * * * *